United States Patent
Emery et al.

(10) Patent No.: US 9,542,058 B2
(45) Date of Patent: Jan. 10, 2017

(54) SYSTEM AND METHOD FOR INTERACTIVE COMPETITIVE RELEASE BOARD

(75) Inventors: Melissa Emery, Del Rey, CA (US); Ivan Gueron, Brentwood, CA (US); Sung Kim, San Pedro, CA (US); Adrian McMillian, Los Angeles, CA (US); Gurvinder Singh, Redondo Beach, CA (US)

(73) Assignees: SONY CORPORATION, Tokyo (JP); SONY PICTURES ENTERTAINMENT, Los Angeles, CA (US)

(*) Notice: Subject to any disclaimer, the term of this patent is extended or adjusted under 35 U.S.C. 154(b) by 742 days.

(21) Appl. No.: 12/799,223

(22) Filed: Apr. 21, 2010

(65) Prior Publication Data
US 2010/0299624 A1 Nov. 25, 2010

Related U.S. Application Data

(60) Provisional application No. 61/171,400, filed on Apr. 21, 2009.

(51) Int. Cl.
*G06F 3/048* (2013.01)
*G06F 17/30* (2006.01)
*G06Q 10/10* (2012.01)

(52) U.S. Cl.
CPC ......... *G06F 3/048* (2013.01); *G06F 17/30572* (2013.01); *G06Q 10/109* (2013.01)

(58) Field of Classification Search
CPC ..... G06Q 10/109; G06Q 10/02; G06F 3/0482; G06F 17/30716; G06F 17/211; G06F 17/24; G06F 17/30554; G06F 17/30864; G06F 17/30867; H04N 21/47205; H04N 21/4825
USPC .................................................. 715/771, 963
See application file for complete search history.

(56) References Cited

U.S. PATENT DOCUMENTS

| | | | |
|---|---|---|---|
| 6,073,119 A * | 6/2000 | Bornemisza-Wahr et al. . | 705/42 |
| 6,369,840 B1 * | 4/2002 | Barnett et al. ................ | 715/853 |
| 6,424,995 B1 * | 7/2002 | Shuman ....................... | 709/206 |
| 6,690,979 B1 * | 2/2004 | Smith ............................ | 700/65 |
| 6,847,969 B1 * | 1/2005 | Mathai et al. | |
| 7,039,596 B1 * | 5/2006 | Lu ................................ | 705/7.13 |
| 7,174,517 B2 * | 2/2007 | Barnett et al. ................ | 715/764 |
| 7,272,859 B2 * | 9/2007 | Kuriya et al. ................. | 726/29 |
| 7,631,274 B2 * | 12/2009 | Kumagai et al. ............ | 715/815 |
| 7,668,775 B2 * | 2/2010 | Lu ................................. | 705/37 |
| 7,746,730 B2 * | 6/2010 | Olayinka et al. ............. | 368/28 |
| 7,891,010 B2 * | 2/2011 | Kuriya et al. ................. | 726/29 |
| 7,924,395 B2 * | 4/2011 | Moore et al. .................. | 352/40 |
| 8,028,322 B2 * | 9/2011 | Riedl et al. ................... | 725/134 |
| 8,073,733 B1 * | 12/2011 | Caland ......................... | 705/14.4 |

(Continued)

*Primary Examiner* — Jeffrey A Gaffin
*Assistant Examiner* — Mandrita Brahmachari
(74) *Attorney, Agent, or Firm* — Frommer Lawrence & Haug LLP; William S. Frommer

(57) ABSTRACT

A method and system for manipulating data that includes accessing content data related to an upcoming event that is scheduled for release. A data record for the event is generated from information about the event such as day and month of release. A first representation of the event release information is displayed on a display module such as a monitor so that position of the release information relates to the date of release. The first representation may then be accessed to display additional data and the position of the event release may change based on changes to the event.

20 Claims, 35 Drawing Sheets

(56) References Cited

U.S. PATENT DOCUMENTS

| | | | |
|---|---|---|---|
| 8,095,406 B2* | 1/2012 | Nakamura et al. | 705/7.12 |
| 2004/0268403 A1* | 12/2004 | Krieger et al. | 725/112 |
| 2006/0047698 A1* | 3/2006 | Fox | 707/103 X |
| 2006/0106805 A1* | 5/2006 | Aaron | 707/10 |
| 2006/0123360 A1* | 6/2006 | Anwar et al. | 715/810 |
| 2006/0190313 A1* | 8/2006 | Lu | 705/8 |
| 2007/0250512 A1* | 10/2007 | Friedlander et al. | 707/10 |
| 2008/0097777 A1* | 4/2008 | Rielo | 705/1 |
| 2008/0254780 A1* | 10/2008 | Kuhl et al. | 455/418 |
| 2009/0024590 A1* | 1/2009 | Sturge et al. | 707/3 |
| 2011/0019503 A1* | 1/2011 | Oehler | 368/10 |

* cited by examiner

2009 MAY | MPAA RATING [ G | PG | PG-13 | R | NC-17 ] [UPDATED]
1 — 8 — 15 — 22 — 29

GHOSTS / WARNER B
STAR TR / PARAMOUN
MY LIFE / FOX SEARC
ANGELS / COLUMBIA
X-MEN / FOX
NIGHT A / FOX
WILD CH / UNIVERSAL
BRUNO / UNIVERS
UP (2009) / BUENA VIS
DRAG M / UNIVERSAL
NEXT DA
BROTHE
LIMITS C
MAIDEN
EASY VII 800
106
104

PARAMOUNT — 652
CASE 39 — 654
INFO >> — 655
TRAILERS — 656
IMDB >> — 657

INFO
TITLE: CASE 39
RELEASE DATE: 04/10/2009
STUDIO: PARAMOUNT
RATING:
RELEASING ENTITY: PARAMOUNT
IMDB URL:
AKA:
SYNOPSIS: A social worker tries to rescue a young girl from abusive
ACTORS: Zellweger, Renee; McShane, Ian
DIRECTORS: Alvart, Christian
PRODUCERS:
WRITERS:

802
760

2009 AF
OTHER STUDIOS

VIDEOWALL

| LIST VIEWS | | | 1240 | | |
|---|---|---|---|---|---|
| ALL TITLES | | 1214(a) | 1216(a) | 1218(a) | 1220(a) |
| FILTER [ ] | 197 MOVIES | ⊘⌂☐≡ | ADD | | |
| LORNA'S SILENCE | SONY PICTURES | TRISTAR | 08/27/08 | G |
| CLASS, THE | OTHER STUDIOS | OTHER | 09/24/08 | PG-13 |
| GRAN TORINO | WARNER BROS. | WARNER BROS. | 12/12/08 | R |
| LAST CHANCE HARVEY | OTHER STUDIOS | OTHER | 12/25/08 | PG-13 |
| PROPOSAL, THE (2009) | OTHER STUDIOS | OTHER | 12/31/08 | |
| DEFIANCE (2008) | PARAMOUNT | PARAMOUNT | 12/31/08 | R |
| HOTEL FOR DOGS | SONY PICTURES | PARAMOUNT | 01/16/09 | PG |
| MY BLOODY VALENTINE 3D | LIONSGATE | LIONS GATE | 01/16/09 | R |
| NOTORIOUS | 20TH CENTURY | FOX SEARCHLIGHT | 01/16/09 | R |
| POSSESSION (2009) | OTHER STUDIOS | OTHER | 01/23/09 | PG-13 |
| KILLSHOT(2008) | MGM | MGM | 01/23/09 | R |
| INKHEART | OTHER STUDIOS | OTHER | 01/23/09 | |
| UNDERWORLD: RISE OF THE LYCANS | SONY PICTURES | COLUMBIA | 01/30/09 | PG-13 |
| TAKEN (2009) | 20TH CENTURY | FOX | 01/30/09 | PG-13 |
| NEW IN TOWN | LIONSGATE | LIONS GATE | 01/30/09 | |
| PAUL BLART: MALL COP | WARNER BROS. | COLUMBIA | 01/30/09 | PG |
| UNINVITED, THE (2009) | PARAMOUNT | PARAMOUNT | 02/06/09 | PG-13 |
| PINK PANTHER 2, THE | SONY PICTURES | TRISTAR | 02/06/09 | PG |
| PUSH (2009) | OTHER STUDIOS | OTHER | 02/06/09 | PG-13 |
| CORALINE | OTHER STUDIOS | OTHER | 02/06/09 | PG |
| HE'S JUST NOT THAT INTO YOU | WARNER BROS. | WARNER BROS. | 02/06/09 | PG-13 |
| FANBOYS | MGM | MGM | 02/06/09 | PG-13 |
| CONFESSIONS OF A SHOPAHOLIC | WALT DISNEY | BUENA VISTA | 02/13/09 | PG |
| TWO LOVERS (2009) | OTHER STUDIOS | MAGNOLIA FILM | 02/13/09 | |
| ALL TITLES BY ENTITY | | | | |
| TITLES WITH RELEASE DATES | | | | |
| TITLES W/O RELEASE DATES | | | | |
| TITLES ARCHIVE | | | | |

VIDEOWALL

1400

1) SEARCH FOR MOVIE  1402
MOVIE NAME [ANGELS &]  [SEARCH]

2) SEARCH FOR MOVIE FROM RESULTS  1404
SEARCH RESULTS [ANGELS & DEMONS]
[ANGELS & INSECTS]

3) EDIT AND SAVE (PRESENT IN CRB)  1408
- TITLE [ANGELS & DEMONS]  1410
- RELEASE DATE [05/20/2009]  1412
- STUDIO [SONY PICTURES]  1414
- RATING [PG13]  1416
- RELEASING ENTITY [COLUMBIA]  1418
- IMDB URL [http://www.imdb.co.m/title/tt0808151/]
- SYNOPSIS [Robert Langdon tries to solve a murder and unravel a plot by an ancient group, the illuminati, to blow up the Vatican during a papal conclave.]  1420
- AKAS [GOLDSMAN, AKIVA PROJECT (Formerly Known As)]  1422
- ACTORS [Hanks, Tom; McGregor, Ewan; Zurer, Ayelet; Skarsgard, Stellan; Favino, Pierfrancesco; Kaas, Nikolaj Lie; Mueller-Stahl, Armin]  1424
- DIRECTORS [Howard, Ron]  1426
- PRODUCERS [Grazer, Brian; Howard, Ron; Calley, John]  1428
- WRITERS [ ]  1430

(EDIT) [CLOSE]
1434    1336

2009 MAY

OSTS
RNER 3

STAR T
PARAMO

MY LIF
FOX SEA

WILD C
UNIVERS

[NEXT]

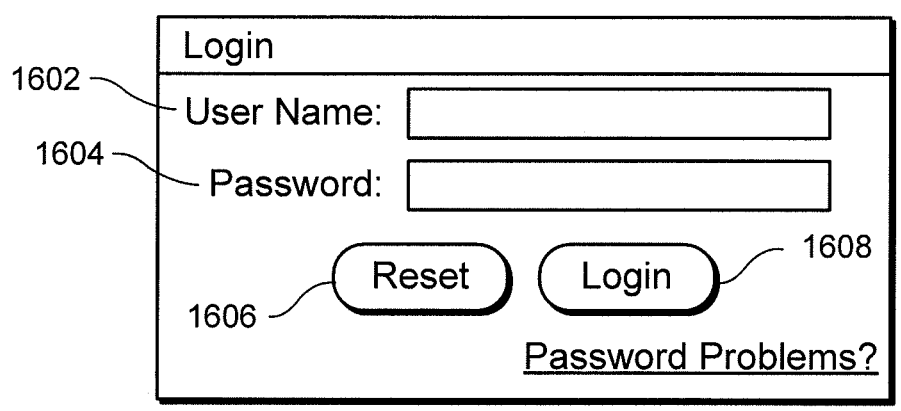
F I G. 16

DESKTOP

LIST VIEWS 1240 2500

ALL TITLES    1214(a)   1216(a)   1218(a)   1220(a)

FILTER [ ] | 197 MOVIES | [icons] | ADD

| Title | Studio | Distributor | Date | Rating |
|---|---|---|---|---|
| LORNA'S SILENCE | SONY PICTURES | TRISTAR | 08/27/08 | G |
| CLASS, THE | OTHER STUDIOS | OTHER | 09/24/08 | PG-13 |
| GRAN TORINO | WARNER BROS. | WARNER BROS. | 12/12/08 | R |
| LAST CHANCE HARVEY | OTHER STUDIOS | OTHER | 12/25/08 | PG-13 |
| PROPOSAL, THE (2009) | OTHER STUDIOS | OTHER | 12/31/08 | |
| DEFIANCE (2008) | PARAMOUNT | PARAMOUNT | 12/31/08 | R |
| HOTEL FOR DOGS | SONY PICTURES | PARAMOUNT | 01/16/09 | PG |
| MY BLOODY VALENTINE 3D | LIONSGATE | LIONS GATE | 01/16/09 | R |
| NOTORIOUS | 20TH CENTURY | FOX SEARCHLIGHT | 01/16/09 | R |
| POSSESSION (2009) | OTHER STUDIOS | OTHER | 01/23/09 | PG-13 |
| KILLSHOT (2008) | MGM | MGM | 01/23/09 | R |
| INKHEART | OTHER STUDIOS | OTHER | 01/23/09 | |
| UNDERWORLD: RISE OF THE LYCANS | SONY PICTURES | COLUMBIA | 01/30/09 | PG-13 |
| TAKEN (2009) | 20TH CENTURY | FOX | 01/30/09 | PG-13 |
| NEW IN TOWN | LIONSGATE | LIONS GATE | 01/30/09 | |
| PAUL BLART: MALL COP | WARNER BROS. | COLUMBIA | 01/30/09 | PG |
| UNINVITED, THE (2009) | PARAMOUNT | PARAMOUNT | 02/06/09 | PG-13 |
| PINK PANTHER 2, THE | SONY PICTURES | TRISTAR | 02/06/09 | PG |
| PUSH (2009) | OTHER STUDIOS | OTHER | 02/06/09 | PG-13 |
| CORALINE | OTHER STUDIOS | OTHER | 02/06/09 | PG |
| HE'S JUST NOT THAT INTO YOU | WARNER BROS. | WARNER BROS. | 02/06/09 | PG-13 |
| FANBOYS | MGM | MGM | 02/06/09 | PG-13 |
| CONFESSIONS OF A SHOPAHOLIC | WALT DISNEY | BUENA VISTA | 02/13/09 | PG |
| TWO LOVERS (2009) | OTHER STUDIOS | MAGNOLIA FILM | 02/13/09 | |

ALL TITLES BY ENTITY
TITLES WITH RELEASE DATES
TITLES W/O RELEASE DATES
TITLES ARCHIVE

DESKTOP
2700

1) SEARCH FOR MOVIE — 1402
MOVIE NAME: ANGELS &    [SEARCH]
1302

2) SEARCH FOR MOVIE FROM RESULTS — 1404
SEARCH RESULTS: ANGELS & DEMONS
                ANGELS & INSECTS
1304

2009 MAY
OSTS
RNER B

3) EDIT AND SAVE (PRESENT IN CRB) — 1408
TITLE: ANGELS & DEMONS — 1410
RELEASE DATE: 05/20/2009 — 1412
STUDIO: SONY PICTURES — 1414
RATING: PG13 — 1416
RELEASING ENTITY: COLUMBIA — 1418
IMDB URL: http://www.imdb.com/title/tt0808151/ — 1420
SYNOPSIS: Robert Langdon tries to solve a murder and unravel a plot by an ancient group, the Illuminati, to blow up the Vatican during a papal concleve.
AKAS: GOLDSMAN, AKIVA PROJECT (Formerly Known As) — 1422
ACTORS: Hanks, Tom; McGregor, Ewan; Zurer, Ayelet; Skarsgard, Stellan; Favino, Pierfrancesco; Kaas, Nikolaj Lie; Mueller-Stahl, Armin — 1424
DIRECTORS: Howard, Ron — 1426
PRODUCERS: Grazer, Brian; Howard, Ron; Calley, John — 1428
WRITERS: — 1430

1306

STAR
PARAMO

MY LIF
FOX SEA

WILD
UNIVERS

NEXT

[EDIT] [CLOSE]
1434     1336

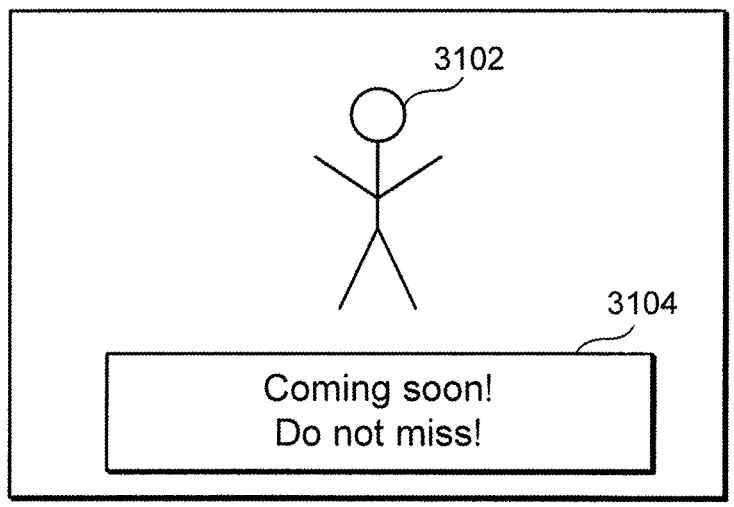
F I G. 31

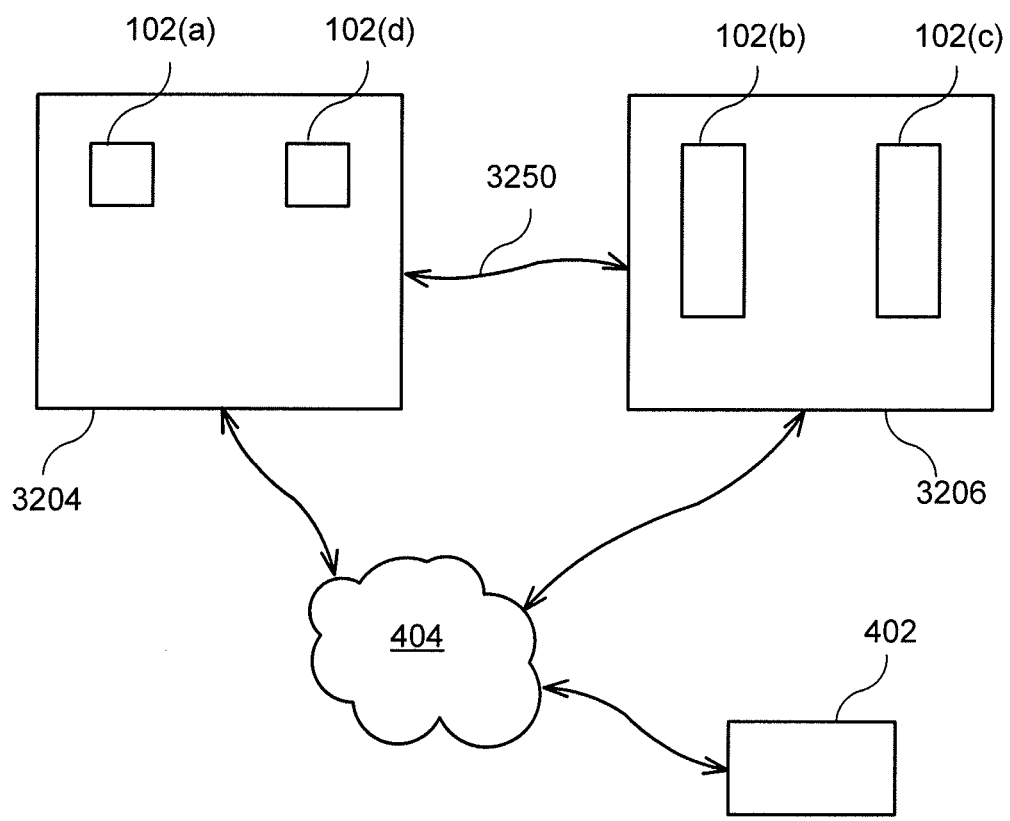
F I G. 32

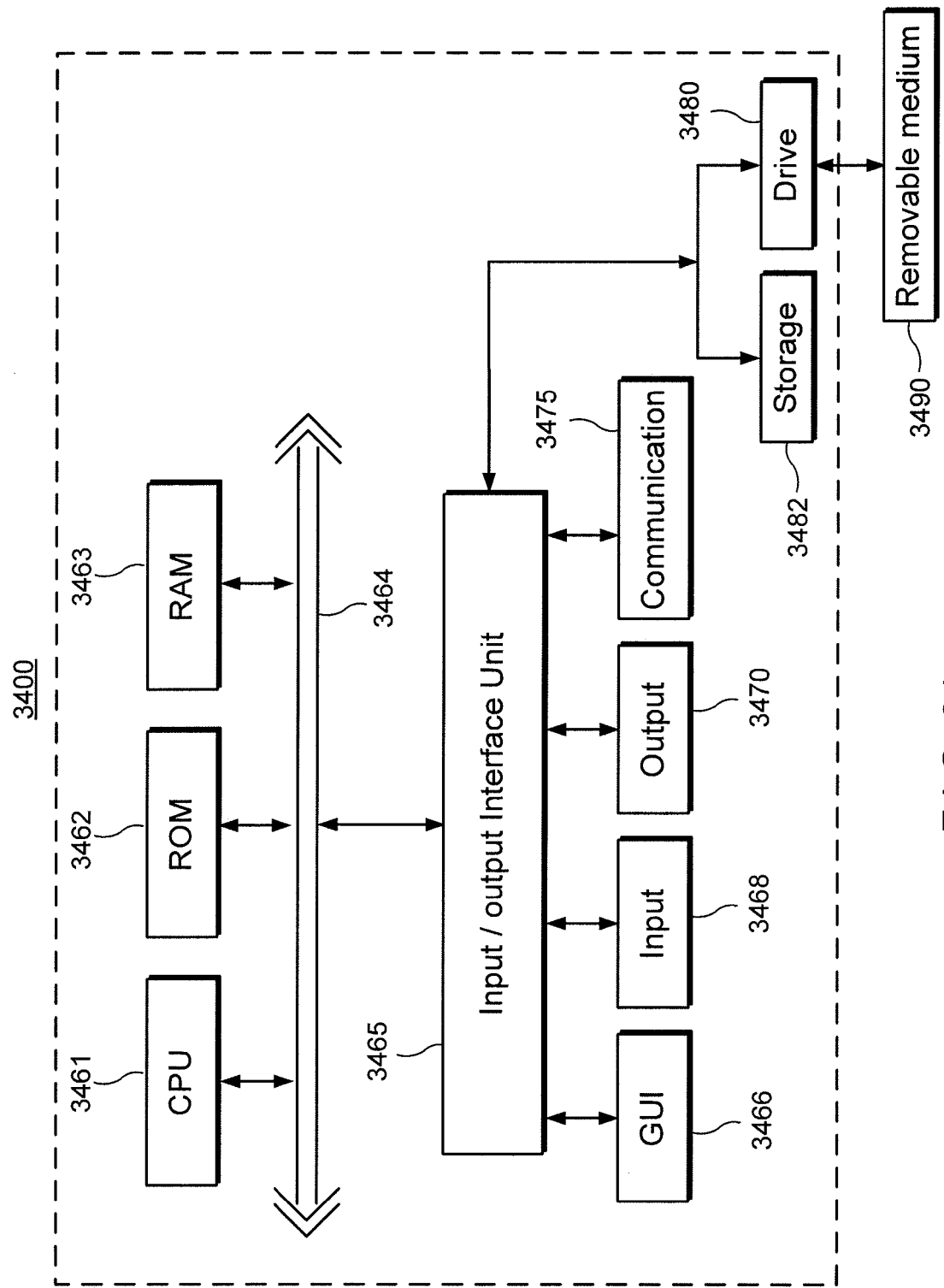
F I G. 34

SYSTEM AND METHOD FOR INTERACTIVE COMPETITIVE RELEASE BOARD

CROSS REFERENCE TO RELATED APPLICATIONS

This application is a Continuation Application of U.S. Provisional Application Ser. No. 61/171,400 filed on Apr. 21, 2009 and claims the priority benefit thereof. This application hereby incorporates the entirety of U.S. Provisional Application Ser. No. 61/171,400 by reference herein.

BACKGROUND

1. Field of the Invention

This invention relates generally to a system and method for an interactive competitive release board (also referred to as a "CRB" herein) that may be updated and/or revised. More particularly, the present invention relates to an electronic competitive release board that provides access to content data as well as additional data, both of which can be accessed and displayed in a variety of formats.

2. Background Discussion

Typically, a conventional release board is implemented using a display board, such as cardboard, poster board or other material that is mounted to a wall, or an easel, that shows, for example, 12-18 months worth of releasing information via a monthly calendar layout. Movie information, typically written on VELCRO™-backed paper or cardboard cards are attached to a VELCRO™ surface of the poster board. The VELCRO™-backed cards are physically moved as releasing dates change for movie studios and productions. Updating or modifying this type of release board requires a person to manually move and re-align all the cards to account for any new information or any change in movie release dates. This shifting process is labor intensive and tends to introduce errors in the relative positioning of the cards.

SUMMARY

Embodiments of the present invention are directed to methods and apparatus and systems for a competitive release board that shows release dates for events, such as movies, sporting events, retail sales dates, new product launches, album releases, television shows, radio programs, magazine releases and virtually any event that is publicized or released for public exposure. For discussion purposes, a competitive release board for movie releases by studios will be used to describe embodiments of the present invention. However, one will understand that embodiments of the present invention will also apply to other release activities as well, such as the types mentioned above. Generally, embodiments of the present invention are directed manipulating data via an electronic CRB to provide an efficient and easily updated display of upcoming dates of significance.

Accordingly one embodiment of the present invention is directed to a method for manipulating data (the method) that includes accessing content data from one or more sources of content data. A data record is generated from the content data. A first representation of the data record is displayed on one or more display modules such that the display position is a function of a portion of the content data and any additional data that has augmented the data record. The first representation of the data record may be accessed to display additional data associated with the content data. The data record that has been accessed may then be revised, for example, based on the additional data, and the representation of the data record is then displayed in a new position on the CRB.

Accordingly, another embodiment of the present invention is directed to the method described above that also includes identifying one or more contingency conditions as content data and utilizing the contingency condition to position the representation of the data record.

Yet another embodiment of the present invention is directed to the method described above and also includes modifying a portion of the content data based on the contingency condition. This may be, for example, changing a release date of a movie production.

Yet another embodiment of the present invention is directed to the method described above and the content data includes sporting event data, entertainment event data.

Yet another embodiment of the present invention is directed to the method described above and also includes establishing one or more alert criterion based on accessed data.

Yet another embodiment of the present invention is directed to the method described above and also includes modifying the portion of the content data based on the one or more alert criterion.

Yet another embodiment of the present invention is directed to the method described above and also includes utilizing a plurality of display devices configured such that each display device displays a predetermined amount of data.

Yet another embodiment of the present invention is directed to the method described above and also includes utilizing a single display device configured to display a predetermined amount of data.

Yet another embodiment of the present invention is directed to the method described above and also includes displaying a first quantity of data at a first display device; and displaying a second quantity of data at a second display device.

Yet another embodiment of the present invention is directed to the method described above and also includes displaying the data records using a scrolling technique.

Yet another embodiment of the present invention is directed to the method described above and also includes sorting each data record.

Yet another embodiment of the present invention is directed to the method described above and the additional data includes audio data, text data or preview data.

Other embodiments of the present invention include the methods described above but implemented using apparatus or programmed as computer code to be executed by one or more processors operating in conjunction with one or more electronic storage media.

BRIEF DESCRIPTION OF THE DRAWINGS

To the accomplishment of the foregoing and related ends, certain illustrative embodiments of the invention are described herein in connection with the following description and the annexed drawings. These embodiments are indicative, however, of but a few of the various ways in which the principles of the invention may be employed and the present invention is intended to include all such aspects and their equivalents. Other advantages, embodiments and novel features of the invention may become apparent from the following description of the invention when considered in conjunction with the drawings. The following description, given by way of example, but not intended to limit the invention solely to the specific embodiments described, may best be understood in conjunction with the accompanying drawings, in which:

FIG. 5 shows an example of a layout design for release data according to an embodiment of the present invention;

FIG. 6 shows an example of additional data displayed with the release data according to an embodiment of the present invention;

FIG. 7 shows another example of additional data that is accessed from an item of the release data according to an embodiment of the present invention;

FIG. 8 shows an example of a revision to the release data according to an embodiment of the present invention;

FIG. 9 shows an example of trailer information that is displayed with release data according to an embodiment of the present invention;

FIG. 10 shows an example of a layout for release data according to an embodiment of the present invention;

FIG. 11 shows an example of settings associated with release data according to an embodiment of the present invention;

FIG. 12 shows an example of titles associated with release data according to an embodiment of the present invention;

FIG. 13 shows an example of a GUI used to add data for the CRB according to an embodiment of the present invention;

FIG. 14 shows an example of a search feature used to search data according to an embodiment of the present invention;

FIG. 15 shows an example of a calendar layout for release data according to an embodiment of the present invention;

FIG. 16 shows an example of a desktop login according to an embodiment of the present invention;

FIG. 17 shows an example of a layout for release data according to an embodiment of the present invention;

FIG. 18 shows an example of an editing feature according to an embodiment of the present invention;

FIG. 19 shows an example of details associated with release data according to an embodiment of the present invention;

FIG. 20 shows an example of additional data associated with release data according to an embodiment of the present invention;

FIG. 21 shows another example of additional data, which can be edited, associated with release data according to an embodiment of the present invention;

FIG. 22 shows an example of trailer information, which can be edited, associated with release data according to an embodiment of the present invention;

FIG. 23 shows an example of details associated with release data according to an embodiment of the present invention;

FIG. 24 shows an example of settings associated with release data according to an embodiment of the present invention;

FIG. 25 shows an example of titles associated with release data according to an embodiment of the present invention;

FIG. 26 shows an example of searching information associated with release data according to an embodiment of the present invention;

FIG. 27 shows another example of searching information associated with release data according to an embodiment of the present invention;

FIG. 28 shows an example of calendar data associated with release data according to an embodiment of the present invention;

FIG. 29 shows an example of a log off screen according to an embodiment of the present invention;

FIG. 31 shows an example of additional data related to a release according to an embodiment of the present invention;

FIG. 32 shows an example of a multi-venue display embodiment of the present invention;

FIG. 34 shows an example of a processor with peripherals used to implement embodiments of the present invention;

DETAILED DESCRIPTION

Figure 1:
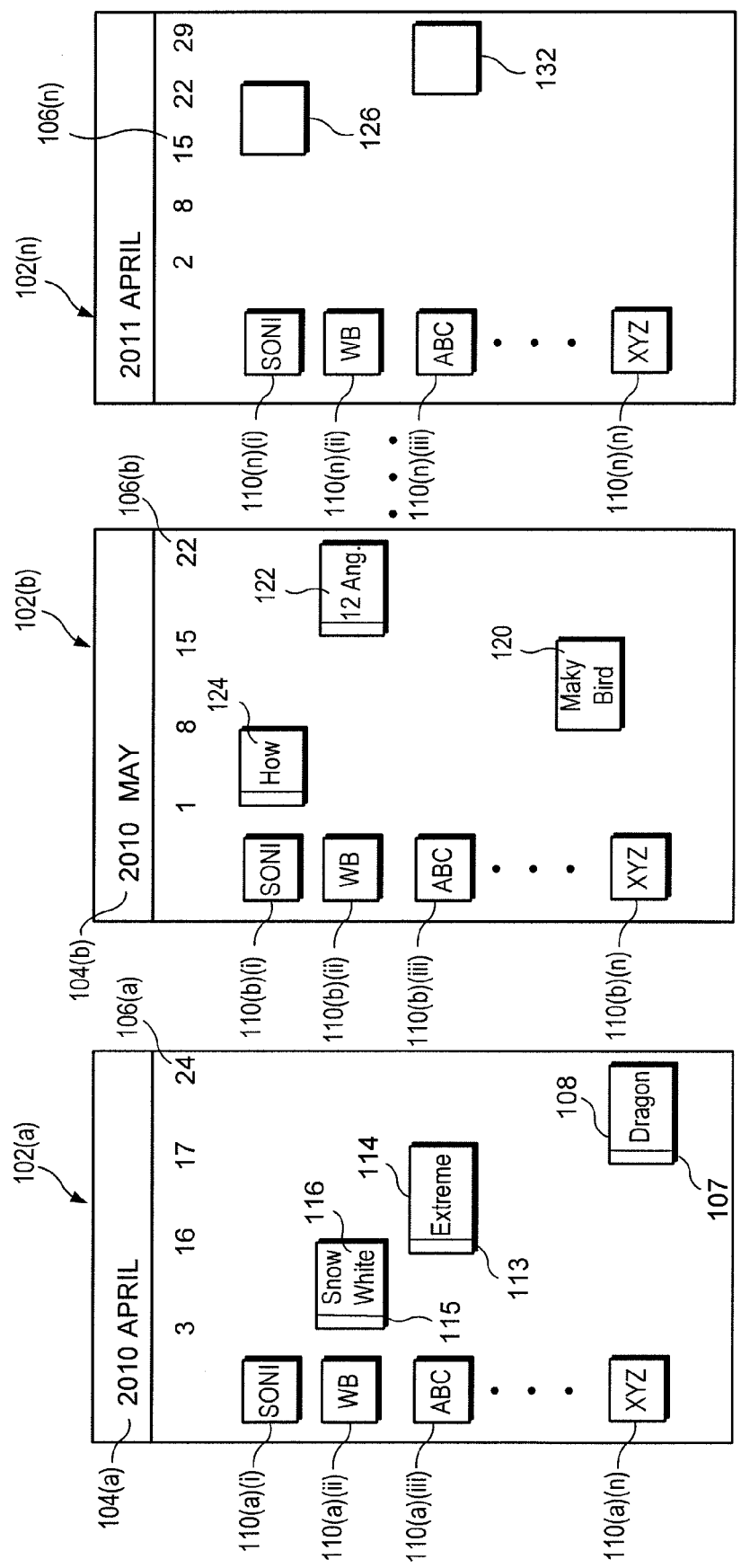
FIG. 1 illustrates an example of a CRB that displays multiple months of release data according to an embodiment of the present invention.

It is noted that in this disclosure and particularly in the claims and/or paragraphs, terms such as "comprises," "comprised," "comprising," and the like can have the meaning attributed to it in U.S. patent law; that is, they can mean "includes," "included," "including," "including, but not limited to" and the like, and allow for elements not explicitly recited. Terms such as "consisting essentially of" and "consists essentially of" have the meaning ascribed to them in U.S. patent law; that is, they allow for elements not explicitly recited, but exclude elements that are found in the prior art or that affect a basic or novel characteristic of the invention. These and other embodiments are disclosed or are apparent from and encompassed by, the following description. As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Furthermore, the detailed description describes various embodiments of the present invention for illustration purposes and embodiments of the present invention include the methods described and may be implemented using one or more apparatus, such as processing apparatus coupled to electronic media. Embodiments of the present invention may be stored on an electronic media (electronic memory, RAM, ROM, EEPROM) or programmed as computer code (e.g., source code, object code or any suitable programming language) to be executed by one or more processors operating in conjunction with one or more electronic storage media.

Embodiments of the present invention may be implemented using one or more processing devices, or processing modules or processing facilities. The processing devices, or modules, or facilities, may be coupled such that portions of the processing and/or data manipulation may be performed at one or more processing devices and shared or transmitted between a plurality of processing devices. For example, data related to an event, may be generated at one location and accessed at another location. A module, as used herein, is for example, a series of instructions stored on a computer-readable, or an electronic storage medium storing program code, or a memory unit storing instructions that is coupled to an associated dedicated processing unit for execution of the instructions, the module may be a plug-in unit, stand alone set of instructions, or program code or may be an integral part of a larger component. Each module may be stored in a separate memory or a common computer memory.

According to embodiments of this invention, the Competitive Release Board (CRB) may be a hardware and/or software system or a combination of hardware and software that has the capability to be edited, revised and displayed in numerous formats and numerous version.

The Competitive Release Board (CRB) may be displayed as a plurality of monitor devices such that each monitor device displays a pre-selected amount of release data (e.g., one-month) (videowall display mode) or alternatively as a desktop version of the application, that displays a pre-selected amount of release data on a single monitor (e.g., 12 one-month displays on a desktop computer screen) (desktop display mode). Both versions, or modes, (videowall and desktop) may be used to display release data that may be edited, revised and updated electronically, as well as factor contingency information that may or may not occur. Accessing and using both the desktop and videowall versions are described herein.

Apparatus and methods to implement a technique for displaying and updating information about movies. In one implementation, a competitive release board system includes multiple monitors to display information and a computer system to control the display and accept user input. Each monitor displays movie release information for a particular month, such as the movie title and the movie studio. The information is arranged in a table format, with one row for each studio and columns for dates (e.g., one column per week of a month). A movie title is positioned in a cell in the table based on the corresponding movie studio and release date of the movie. As release dates change, movie titles can be moved to different cells. Supplemental information about the movie can be accessed through the system as well. For example, actor or director information can be displayed by selecting a movie title in the table and opening an information window.

Embodiments of the present invention are primarily described with reference to movie release data; however, it will be apparent that embodiments described herein also apply to any event with a release date, such as sporting events, music albums, concerts, awards shows (e.g., Academy Awards, Grammys, Oscars) charity events, and other events.

Features provided in implementations of the present invention can include one or more of the following items:
Displaying movie titles in a table format;
Displaying or presenting movie information by accessing movie titles displayed in the table, such as text, audio, and/or video (e.g., movie details, dialogue, music, clips, trailers);
Adjusting the position of movie titles in the table;
Displaying the table across multiple monitors; and
Providing a large multiple monitor version and a software application version that can be used on a single computer system or notebook computer.

As will be described in more detail herein, users can use scrolling capability to scroll out three years in advance. Also, users can see which films have been recently updated because they are highlighted in yellow.

Furthermore, by clicking on a single film title with the mouse, a user can see: Title, Release Date, Studio, Rating, Releasing Entity, IMDB URL (Internet Movie Data Base Uniform Resource Locator), AKA (Also Known As), Synopsis, Actors, Directors, and Writers. Users can also access the films trailer as well as any one sheets (e.g., poster images) associated with the film. Finally, users can access the IMDB (Internet Movie Data Base) link for the film by clicking on the IMDB link. The data for each movie title can be input or edited by a user through the CRB system (either at the wall or in the desktop version).

Icons along the bottom of each monitor allow the user to change the video wall settings. This includes: the ability to hide or show the Studio key on each monitor, the ability to change the background color of each screen or the ability to change which 12 months are currently displayed (rather than using the scroll). Additionally, users can set a "# Days Updated" feature. This changes the number of days a title is highlighted in yellow after data for that title has been updated.

There are also "list views" which display all the calendar data in a spreadsheet format on a single screen. Examples of views include:
All titles;
All titles by entity;
Titles without Release Dates;
Titles with Release Dates; and
Archived Titles.

For each of the above list views, users can sort or filter the data. There is also the option to export data to an application like EXCEL™.

One implementation includes one or more programmable processors and corresponding computer system components to store and execute computer instructions, such as to provide the storage, editing, and display of movie information and coordination of data across multiple monitors.

Additional variations and implementations are also possible. For example, while a multiple monitor system is discussed above (videowall version), a single monitor (desktop version) could also be used. In other implementations, different access formats and platforms could also be provided, such as through a mobile device. In one implementation, the data can also be pulled from a database of movie information (local or remote). In addition, edits to data can be treated as temporary until saved or committed in order to provide for designing proposed schedules (alternatively, multiple files or versions can be created). In another implementation, changes to the data in the CRB system are provided back to a database for future use and for access by other systems.

FIG. 1 illustrates an example of a CRB 100 that displays multiple months of release data according to an embodiment of the present invention. As referred to above, FIG. 1 shows a videowall display format.

The videowall embodiment may be described as including, for example, a plurality, for example, twelve 52" monitors disposed in a "portrait" configuration in order to create a large 12 month calendar across one wall of the room (one month per monitor). A studio key showing each studio is displayed down the left-hand side of each monitor. The videowall is accessed and controlled via a wireless mouse, and/or wireless keyboard. Alternatively, a touchscreen system can also be used or a motion capture/monitoring system to allow selection and manipulation of items directly at the displays.

Monitors 102(a), 102(b) . . . 102(n) (where "n" is any suitable number) each display one-month of release data. Monitors (generally 102) each show an associated month of release data. The monitors 102 may be for example 52" screens used to display data such as image data, video data, and other representations. For descriptive purposes monitor 102(a) will be described; however, other monitors 102(b) . . . (n) have similar features and functions.

Area 104(a) shows the year and month are displayed on monitor 102(a). Specifically "April 2010" is identified in area 104(a). Area 106(a) shows that a calendar format in weekly intervals is displayed for the month of April 2010 and various releasing entities, for example, production studios $110(a)_{(i) \ldots (n)}$, where "n" is any suitable number are also shown. Movie release tiles 108, 114 and 116 are shown that indicate data related to the release, for example, the title of the release, a rating indication and releasing entity or studio. These tiles 108, 114 and 116 are typically electronic display data or electronic records that are arranged on the monitor 102(a) to correspond to the date of proposed release and studio for the month of April, 2010. Tiles 108, 114 and 116 may be accessed to display additional data, as will be described in more detail herein. Electronic tiles or data records 108, 114 and 116 have an associated indicator label 107, 113 and 115, respectively, that provides an indication of other information, such as an update, a studio or other indicia. The associated indicator label may be color specific such that the color of the label indicates a particular activity. For example a yellow label may indicate that the release date has been postponed and an orange label may indicate the release date has been moved to an earlier date.

Also as shown in FIG. 1, a second monitor 102(b) showing another month, May, 2010 as element 104(b). The May 2010 display 102(b) includes releasing entities $110(b)_{(i) \ldots (n)}$, where "n" is any suitable number. Movie release tiles 120, 122 and 124 are shown. These movie release tiles are similar to the tiles (108, 114 and 116) shown on monitor 102(a) except that these tiles (120, 122 and 124) correspond to release information of May 2010. Similar to the tiles of monitor 102(a) tiles 120, 122 and 124 of 102(b) indicate data related to the releases of May 2010, for example, the title of the release, a rating indication and releasing entity or studio. These tiles are typically electronic display data or electronic records that are arranged on the monitor 102(b) to correspond to the date of proposed release and studio for the month of May, 2010.

As shown in FIG. 1, virtually any number of months may be displayed as shown by monitor 102(n). Monitor 102(n) shows release data for the month of April 2011 (104(n)). The monitor 102(n) is similar to the other months and includes movie release tiles 126, 130 and 132, which show release data for the month of April 2011. Thus while 12 months of release data are shown in FIG. 1, it is also an embodiment that more months or fewer months may also be displayed on the videowall.

Figure 2:
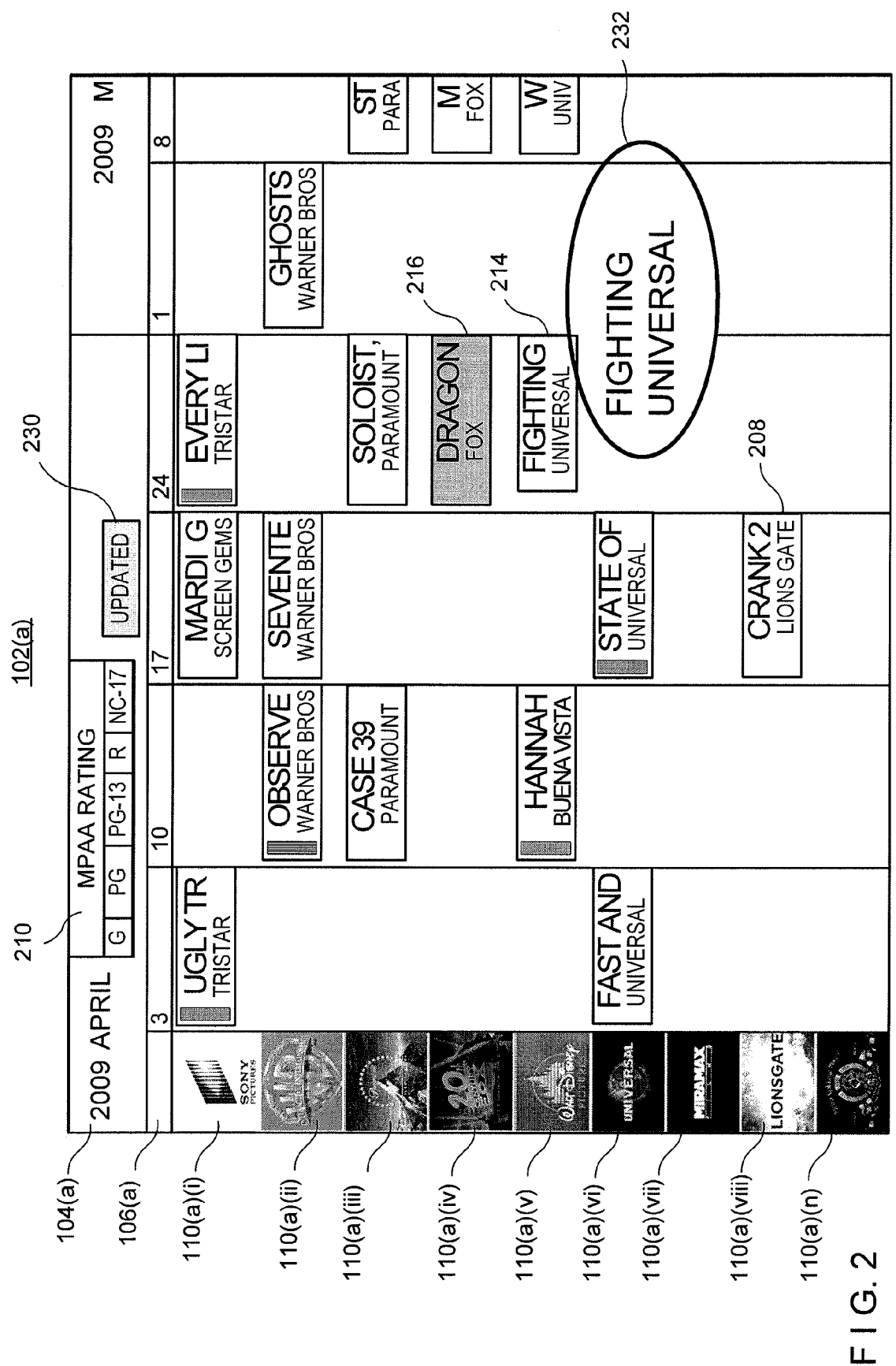
FIG. 2 illustrates an example of a display that displays release data for one month according to an embodiment of the present invention.

FIG. 2 illustrates an example of a display 102(a) that displays release data for one month according to an embodiment of the present invention. FIG. 2 shows a single monitor 102(a), shown in FIG. 1, in more detail.

For example, the layout on monitor 102(a) is as follows:
Month/Year 104(a);
MPAA Ratings Key 210;
"Updated" symbol along the top 230;
Studio Key along left side $110(a)_{(i) \ldots (n)}$, where "n" is any suitable number;
Control Icons along the bottom (shown in FIG. 5).

The Updated symbol 230 may be set so that movies will appear in yellow, or other color or other text indicator, for a specified number of days whenever their title or releasing date changes. The number of days is controlled via the "Change Setting" icon which is discussed herein.

For both movie tiles and icons, a roll-over will display the movie title and studio in larger text on the screen. The example below shows the roll-over text for "Fighting" 232. Tiles 208, 214 and 216 are identified. Other tiles, are shown as well.

Figure 3:
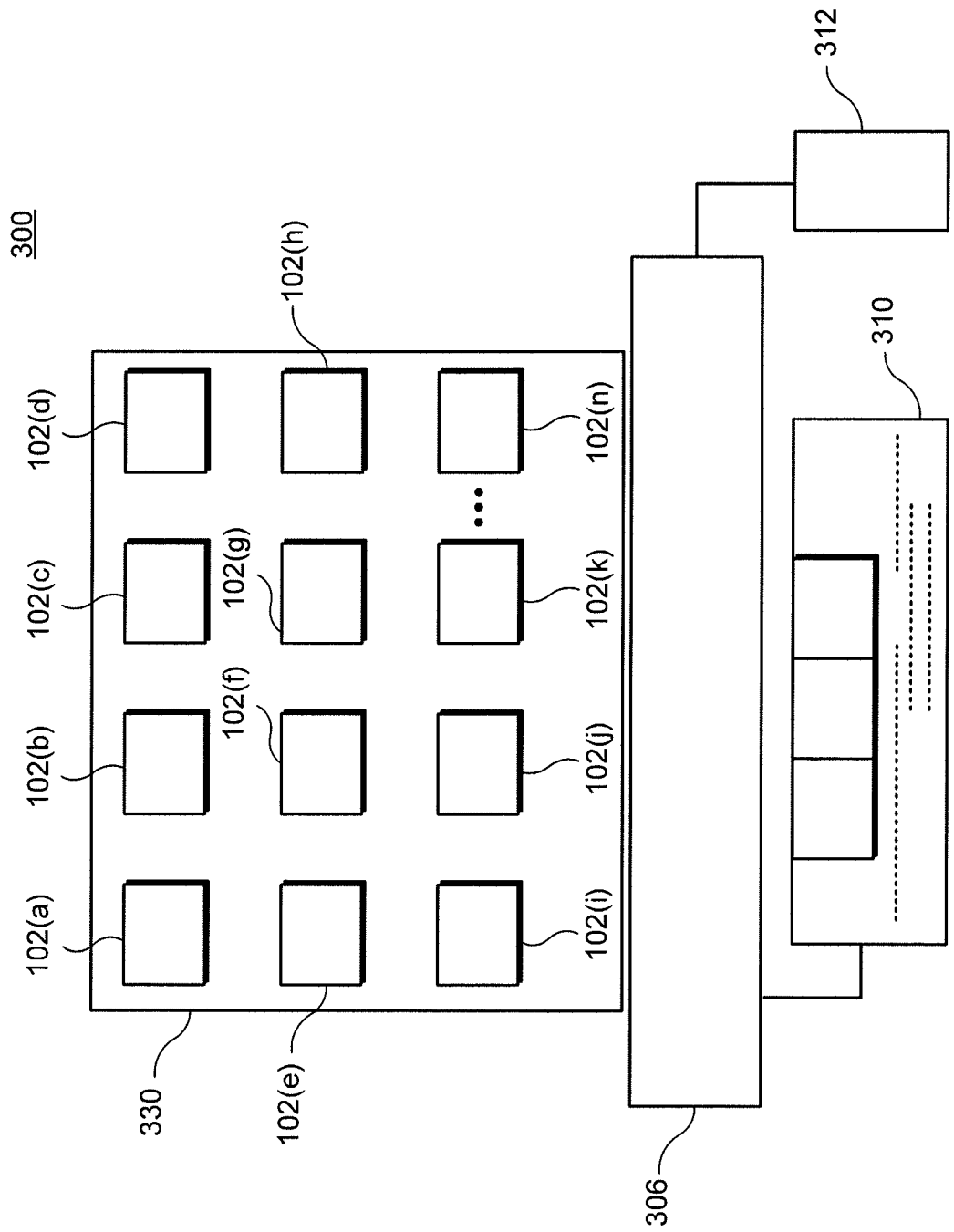
FIG. 3 shows an example of a single display device according to an embodiment of the present invention.

FIG. 3 shows an example 300 of a single display device and computer according to an embodiment of the present invention. As shown in FIG. 3 a desktop version of the present invention is shown. Device 300 is, for example a desktop computer or laptop computer of notebook or PDA, wireless device, cellular telephone, fat client terminal or thin client terminal or other handheld device. The example shown in FIG. 3 is a desktop computer with processor module 306, keyboard 310, mouse 312 and display screen 330. Display screen 330 is used to display multiple months of release data on a single device. The months are shown as 102(a) . . . (n) where "n" is any suitable number. Indeed any suitable display device could be used to simultaneously display a pre-selected amount of release data on a single screen.

Figure 4:
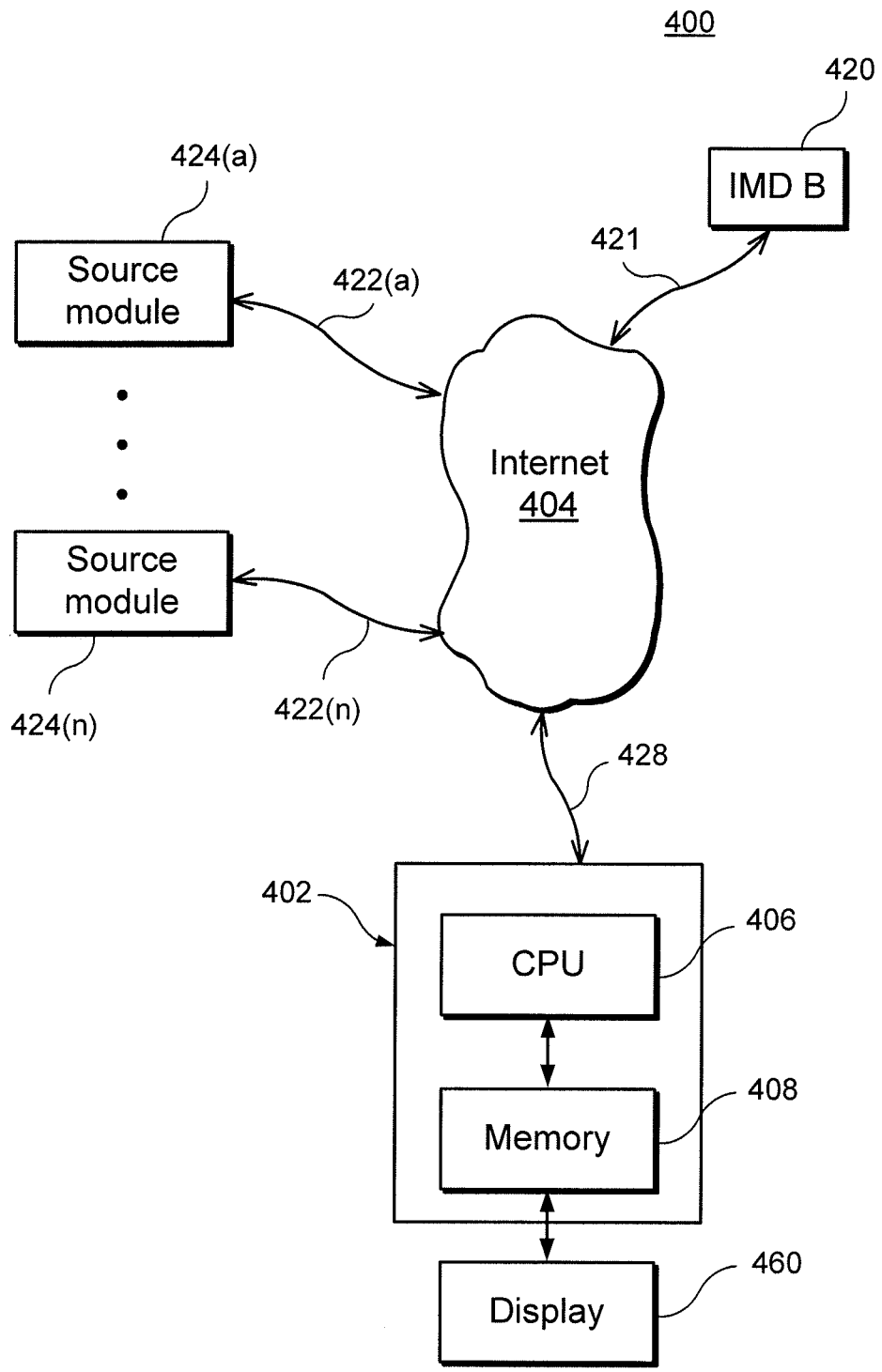
FIG. 4 shows an example of network that supports embodiments of the present invention.

FIG. 4 shows an example of network embodiment 400 that supports embodiments of the present invention. The exemplary environment 400 includes a network 404, a processing module, or facility or device 402 and a display module, facility or device 460. (A module, as used herein, is for example, a series of instructions stored on a computer-readable, or an electronic storage medium storing program code, or a memory unit storing instructions that is coupled to an associated dedicated processing unit for execution of the instructions, the module may be a plug-in unit, stand alone set of instructions, or program code or may be an integral part of a larger component. Each module may be stored in a separate memory or a common computer memory.) FIG. 4 also show a plurality of modules 424(a) . . . 424(n), where "n" is any suitable number and an IMDB module 420.

The network 404 is, for example, any combination of linked computers, or processing devices, adapted to transfer and process data. The network 404 may be private Internet Protocol (IP) networks, as well as public IP networks, such as the Internet that can utilize World Wide Web (www) browsing functionality. An example of a wired network is a network that uses communication busses and MODEMS, or DSL lines, or a local area network (LAN) or a wide area network (WAN) to transmit and receive data between terminals. An example of a wireless network is a wireless LAN. Global System for Mobile Communication (GSM) is another example of a wireless network. The GSM network is divided into three major systems which are the switching system, the base station system, and the operation and support system (GSM). Also, IEEE 802.11 (Wi-Fi) is a commonly used wireless network in computer systems which enables connection to the Internet or other machines that have Wi-Fi functionality. Wi-Fi networks broadcast radio waves that can be picked up by Wi-Fi receivers that are attached to different computers.

Processing module 402 includes CPU 406 and memory 408. Processing module 402 may be for example a computer, or other processing devices such as a PC (personal computer), desktop computer, laptop computer, personal digital assistant (PDA), wireless handheld device, cellular telephone, server, or other device with adequate processing power and processing speed, and the like. They may be capable of processing and storing data themselves or merely capable of accessing processed and stored data from another location (i.e., both thin and fat terminals).

Processing module 402 is operatively connected to network 404, via bi-directional communication channel, or interconnector, 428, which may be for example a serial bus such as IEEE 1394, or other wire or wireless transmission medium. The terms "operatively connected" and "operatively coupled", as used herein, mean that the elements so connected or coupled are adapted to transmit and/or receive data, or otherwise communicate. The transmission, reception or communication is between the particular elements, and may or may not include other intermediary elements. This connection/coupling may or may not involve additional transmission media, or components, and may be within a single module or device or between the remote modules or devices.

The processor module 402 includes a CPU 406, which is typically a processor that includes an arithmetic logic unit (ALU), which performs arithmetic and logical operations, and a control unit (CU), which extracts instructions from memory and decodes and executes them, utilizing the ALU when necessary. An I/O interface may be used to operatively couple the components of processor module 402.

Processor module 402 also includes memory unit 408 that stores electronic data, such as release data, computer programs, I/O control instructions, BIOS, EFI and other interface-related information, which include, for example, a web browser, algorithms, as well as typical operating system programs (not shown), input/output programs (not shown), and other programs that facilitate operation of processing module 402. The web browser (not shown) is for example an Internet browser program such as Internet Explorer'. Memory module 408 may be, for example, an electronic storage medium, such as an electronic storage repository that can store data used by processing module 402. The memory module 408 may include, for example, RAM, ROM, EEPROM or other memory media, such as an optical disk, optical tape, CD, or a floppy disk, a hard disk, or a removable cartridge, on which digital information is stored in the form of bits. The memory module 408 may also be remote memory coupled to processing module 402 via wired or wireless bi-directional communication medium.

Processing module 402 typically includes a display unit 460 and an input unit (not shown). The display unit 460 is used to display the data generated as well as input generated at the processing module 402. The display unit 460 may be, for example, one or more monitors, LCDs (liquid crystal display), plasma screen, a graphical user interface (GUI) or other unit adapted to display output data typically by a representation of pixels to form text and graphic and video data, as described herein and may be configured in the videowall embodiment and/or the desktop embodiment or a multi-room, or multi-venue embodiment (all as described herein). The input unit may include devices such as a keyboard, mouse, track ball and/or touch pad or any combination thereof (not shown in FIG. 4).

The IMDB (Internet Movie Data Base) module 420 is an example of a common source of information that may be accessed by processing module 402 and is adapted to transmit data to, and receive data from other modules in the network 404.

Source modules 424(*a*) . . . (*n*) (where "n" is any suitable number) (generally referred to as 424 herein) are coupled to network 404 via an associated bi-directional communication medium 422(*a*) . . . (*n*), which may be for example a serial bus such as IEEE 1394, or other wire or wireless transmission medium.

The processing module 402, IMDB module 420 and source modules 424(*a*) . . . (*n*) typically utilize a network service provider, such as an Internet Service Provider (ISP) or Application Service Provider (ASP) (ISP and ASP are not shown) to access resources of the network 404.

Figure 5:
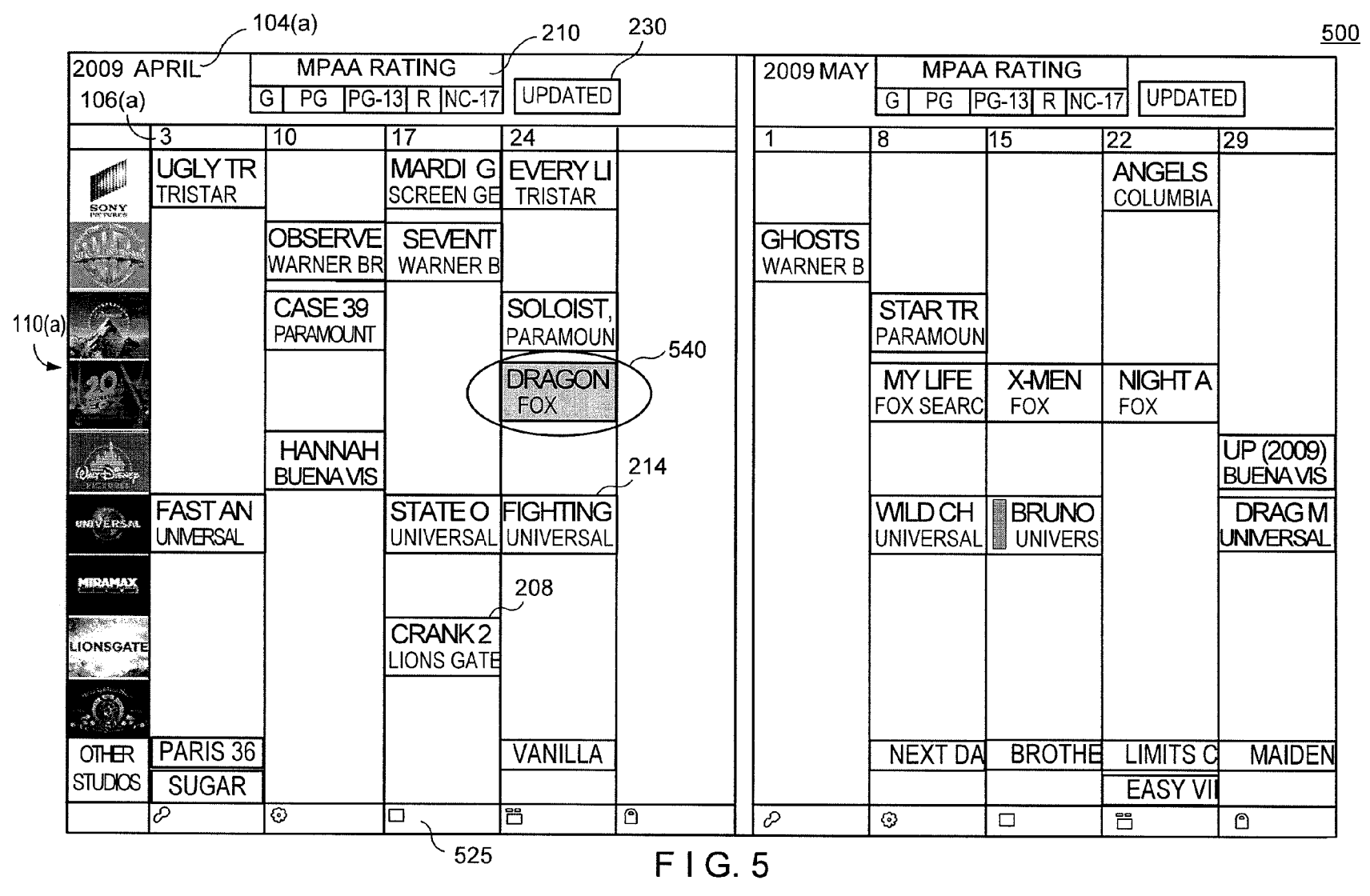

FIG. 5 shows an example 500 of a layout design for release data according to an embodiment of the present invention. As shown in FIG. 5, the CRB may be revised and/or updated by editing the tiles. Specifically, tile 540 is shown as being moved from a previous location, indicating a previous release date to a new position indicating a new release date. Furthermore, an indicator, such as changing the color of the tile 540 indicates that the tile has been moved so as to be displayed in another portion of the display. Menu bar 525 is displayed at the lower portion of the layout design 500 and provides a user the ability to navigate the display 500. As will be apparent, a user can edit the videowall, or desktop to move tiles from one month to another, or delete or add tiles as desired. The other elements shown in FIG. 5 have been described previously (FIGS. 1 and 2) and are not repeatedly described in relation to FIG. 5.

Figure 6:
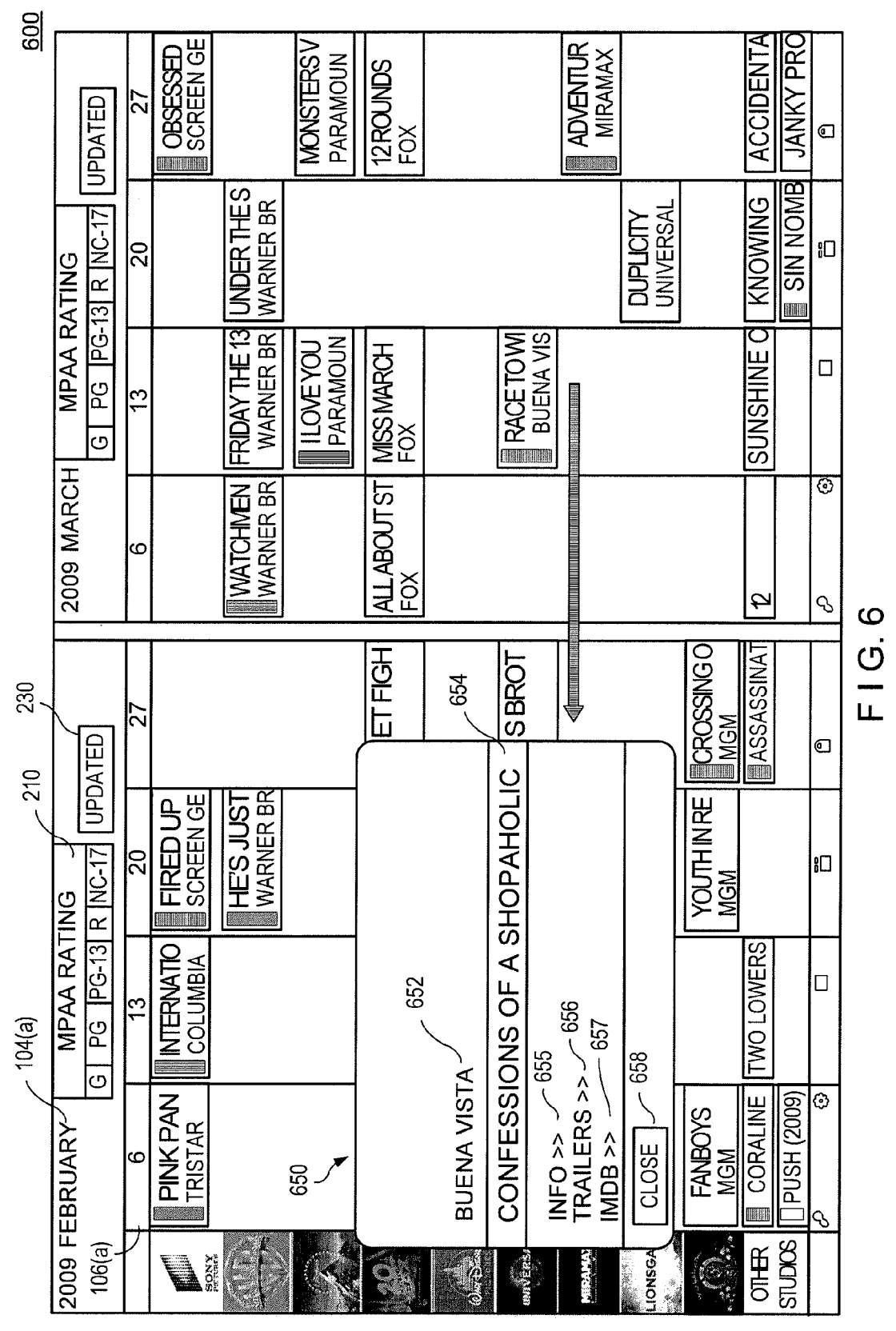

FIG. 6 shows an example 600 of additional data displayed with the release data according to an embodiment of the present invention. Specifically, FIG. 6 shows that a user can access an information link, or area 650 that opens a window to permit a user to view additional data. For example, the studio 652, title 654, information 655, trailer 656, IMDB 657 and close button 658. As will be discussed herein, these areas for additional data may be accessed and edited and saved by a user. The other elements shown in FIG. 6 have been described previously (FIGS. 1 and 2) and are not repeatedly described in relation to FIG. 6.

Figure 7:
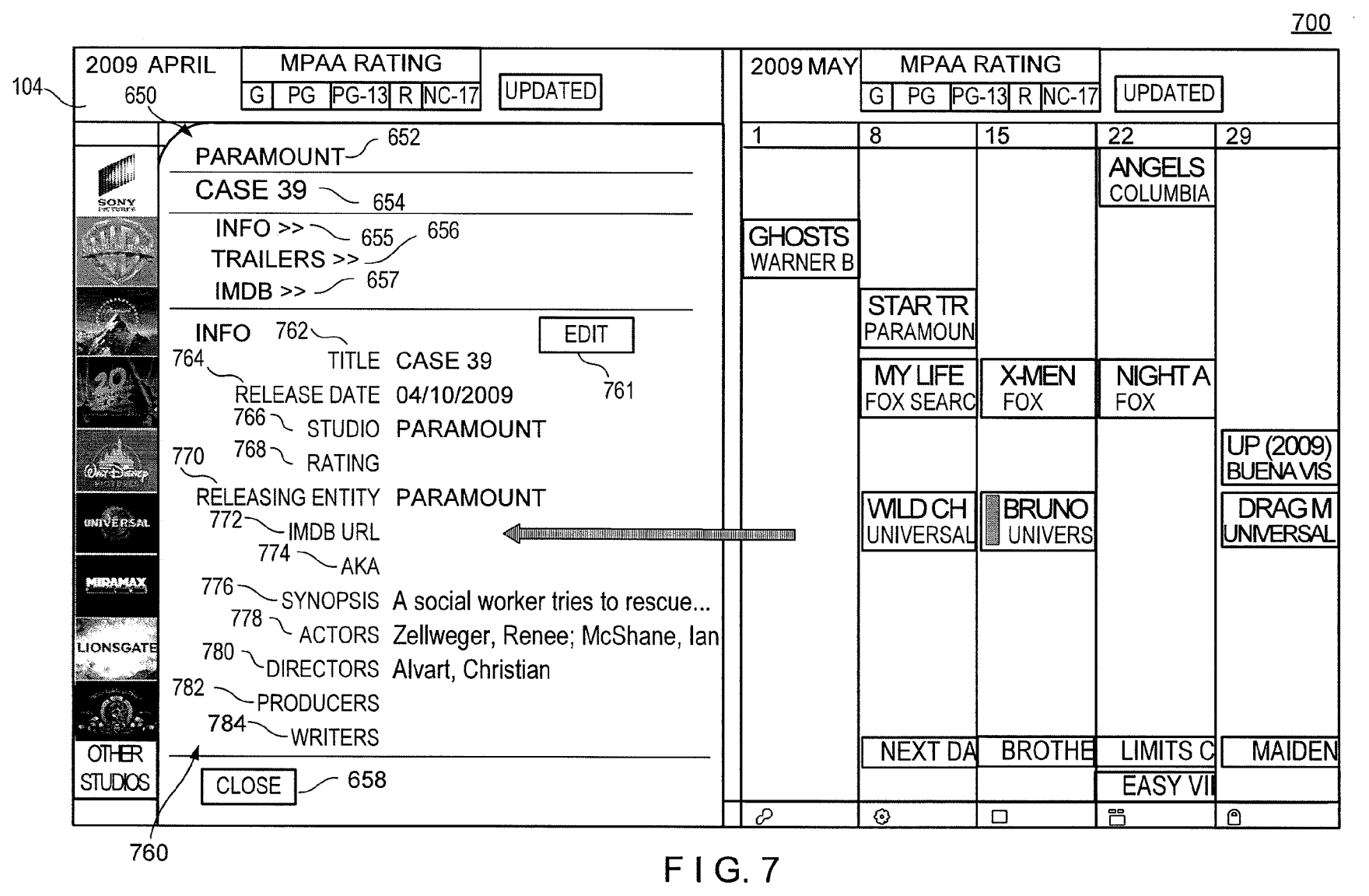

FIG. 7 shows another example 700 of additional data that is accessed from an item of the release data according to an embodiment of the present invention. A user accesses or "clicks" the info link 655 inside the movie details window 650 to open a section that contains fields (generally shown as 760) including fields for: title 762; release date 764; studio 766; rating 768; releasing entity 770; IMDB URL 772; AKA 774; synopsis 776; actors 778; directors 780; producers 782; and writers 784. While the number of fields 760 may be more or less inclusive, than those shown in FIG. 7, each field 760 may be displayed and edited. Based on the edits, the location of the electronic tile may be adjusted. For example, revising the release date will cause the movie tile to be places at a different location on the monitor. Edit button 761 and close button 658 are also shown. The other elements shown in FIG. 7 have been described previously (FIGS. 1 and 2) and are not repeatedly described in relation to FIG. 7.

FIG. 8 shows an example 800 of a revision to the release data according to an embodiment of the present invention. In FIG. 8, once a user, or administrator clicks, or accesses the "edit" button (FIG. 7, element 761) the fields (generally shown as 760 and described in more detail in relation to FIG. 7) may be edited, revised or updated. "Save" button 802 can be accessed to save the edits. The other elements shown in FIG. 8 have been described previously (FIGS. 1, 2 and 7) and are not repeatedly described in relation to FIG. 8.

Figure 9:
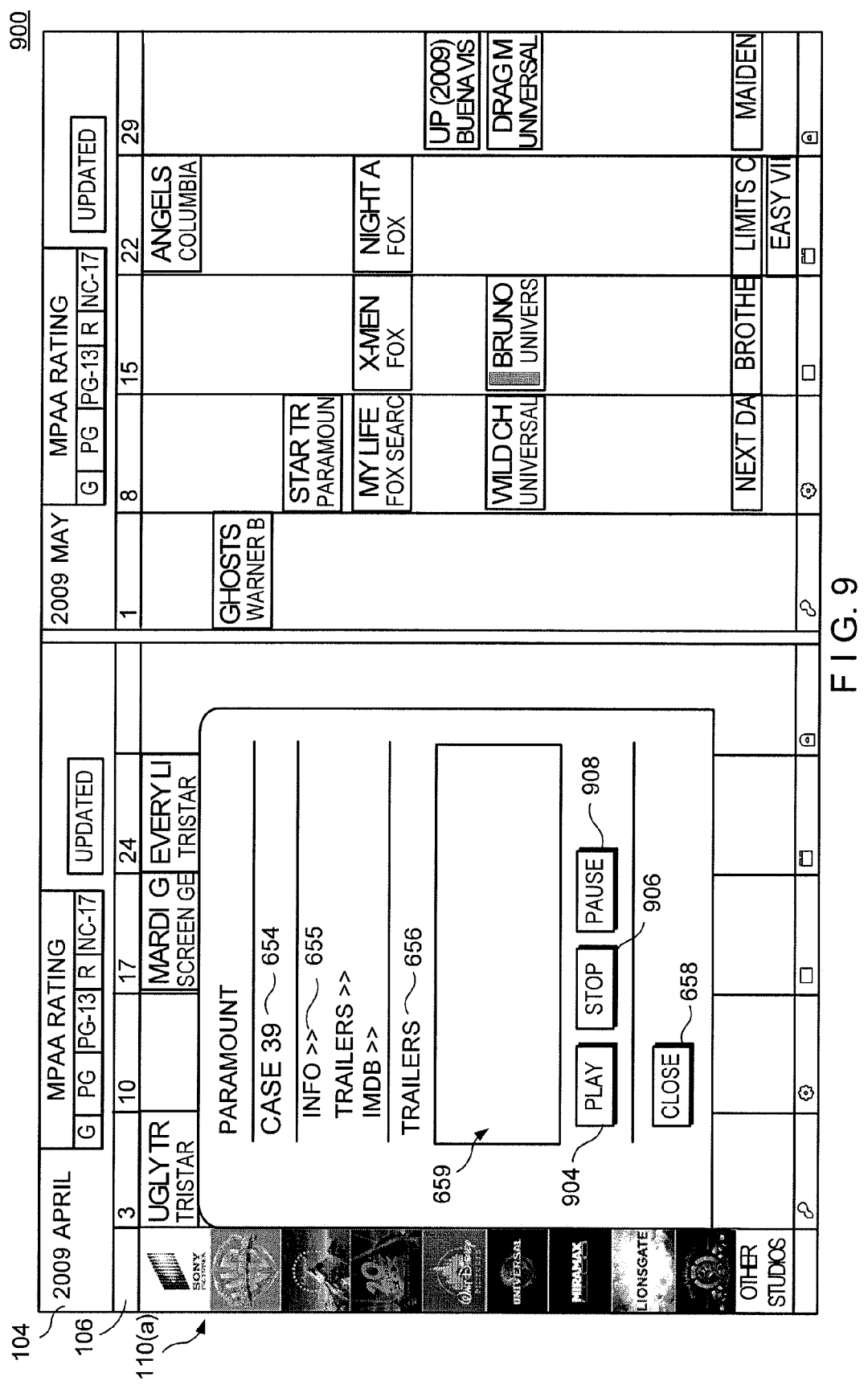

FIG. 9 shows an example 900 of trailer information that is displayed with release data according to an embodiment of the present invention. Users can play trailers by clicking on the trailers link 656 as described herein. Clicking on the trailers link, or button 656 will display a list of trailers for the associated movie title. The trailer data 659 may be audio, visual, audio/visual, a download or other content. The trailer is displayed and played within the display of the month in a dedicated portion. PLAY button 904, STOP button 906 and PAUSE button 908 are also shown in FIG. 9. The trailer may be displayed on the single month display monitor or a different monitor. The PAUSE button 908 can act as a toggle between pause and play functions. The other elements shown in FIG. 9 have been described previously (FIGS. 1, 2, 7 and 8) and are not repeatedly described in relation to FIG. 9.

Figure 10:
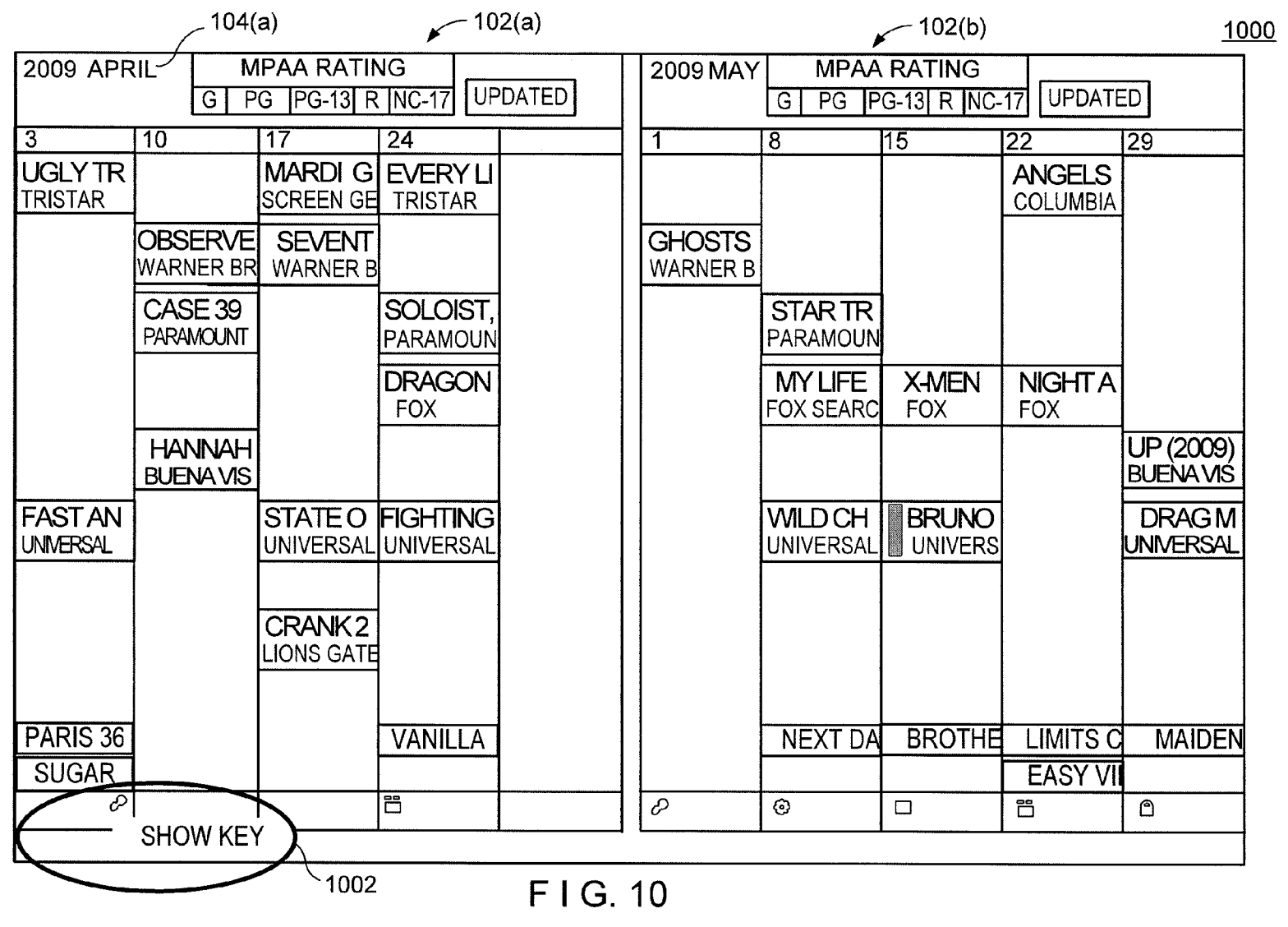

FIG. 10 shows an example 1000 of a layout for release data according to an embodiment of the present invention. FIG. 10 shows a "HIDE/SHOW" functionality. An icon 1002 controls whether or not the display includes information such as the studio releasing the movie. When the "HIDE" function is activated, the display for a month will not show the studio, as shown in FIG. 10. When the "SHOW" function is activated the studio associated with a release will be displayed. As shown in FIG. 10, movie release titles are arranged according to date. Movie titles that have been updated within a predetermined period of time are shown in yellow. The other elements shown in FIG. 10 have been described previously (FIGS. 1, 2, 7, 8 and 9) and are not repeatedly described in relation to FIG. 10.

Figure 11:
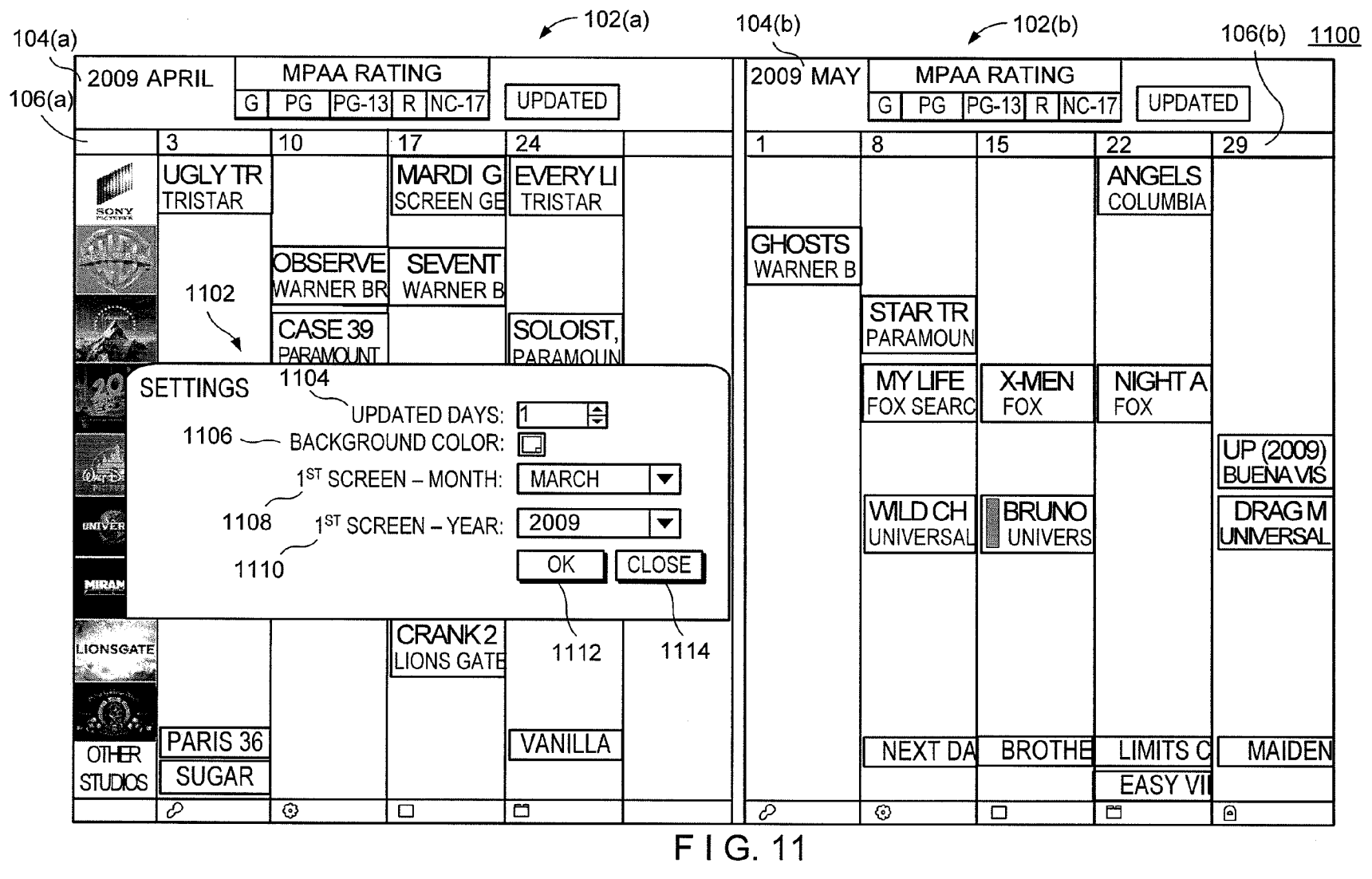

FIG. 11 shows an example 1100 of settings associated with release data according to an embodiment of the present invention. Settings area, or box, or section 1102 provides a user or administrator with the ability to change the number of days a movie maintains updated status, such as a color indicator, as shown by area 1104. Area, or button 1106 shows that a user or administrator can change the background color of the screen. Area or button 1108 and 1110 show that the month (1108) and year (1110) can be modified. Button 1112 is an accept button and button 1114 is a close button. The other elements shown in FIG. 11 have been described previously herein and are not repeatedly described in relation to FIG. 11.

FIG. 12 shows an example 1200 of titles associated with release data according to an embodiment of the present invention. All titles area 1202 shows that titles are being displayed. The titles are listed as shown by 1204(*a*) . . . (*n*) (where "n" is any suitable number), an associated studio 1214(*a*) . . . (*n*), an associated production company 1216(*a*) . . . (*n*), an associated release date 1218(*a*) . . . (*n*) and an associated rating 1220(*a*) . . . (*n*). An "ADD" button 1240 permits a user or administrator to add an entry. Area, or button, 1206 shows that the information may be sorted and displayed according to releasing entity. Area, or button, 1208 shows that the information may be sorted and displayed according to titles with a release date. Area, or button, 1210 shows that the information may be sorted and displayed according to titles that do not have a release date. Area, or button, 1212 shows that the information may be sorted and displayed according to an archive of title information.

Figure 13:
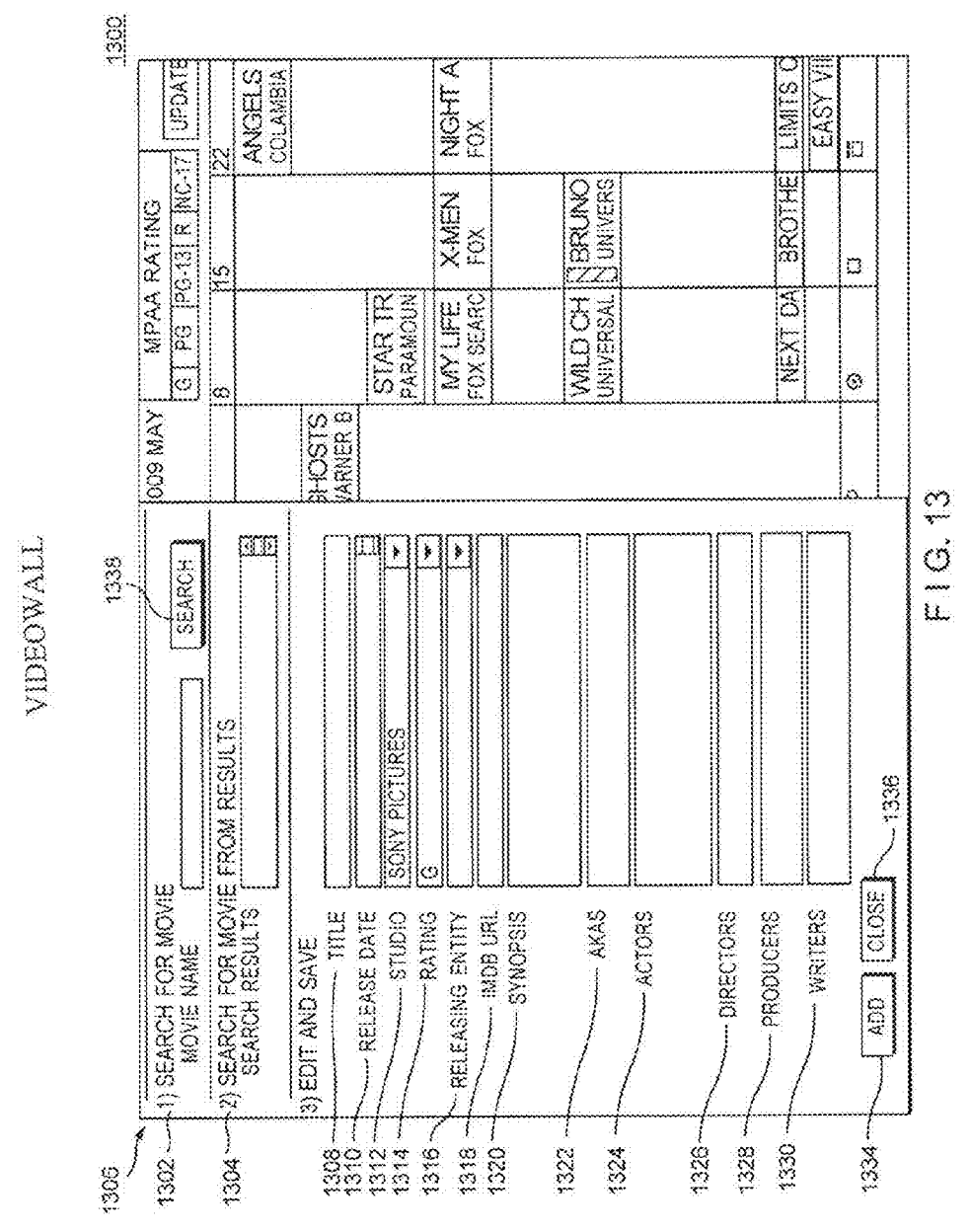

FIG. 13 shows an example 1300 of a GUI used to add data for the CRB according to an embodiment of the present invention. Area 1302 shows a field to search for a particular movie. Button 1338 executes the searching function. Area 1304 permits a user to choose a movie from retrieved results based on the movie name input in area 1302. EDIT AND SAVE portion 1306 shows that a profile of the movie can be edited, updated or revised as shown by the following data fields: Title 1308; Release date 1310; Studio 1312; Rating 1314; Releasing Entity 1316; IMDB URL 1318; Synopsis 1320; AKA(s) 1322; Actors 1324; Directors 1326; Producers 1328; and Writers 1330. Each field in EDIT AND SAVE portion 1306 may be revised and the revisions changed. The revisions, such as changing the release date will cause the display of release data, as described herein to be updated electronically so the display will reflect the revised information. Also, it is an embodiment of the present invention that a user, or administrator will identify themselves when making changes to the data records using these input techniques. This adds accountability and integrity as well as the ability to trace and track who is making particular changes and when the changes were made.

ADD button 1334 permits a user to add additional information and CLOSE button 1336 permits a user to close out of this screen.

FIG. 14 shows an example 1400 of a search feature used to search data according to an embodiment of the present invention. FIG. 14 is similar to FIG. 13 with the difference being the fields are shown as containing data. Area 1302 shows a field to search for a particular movie, similar to FIG. 13. Area 1402 shows that the first portion of a title is input. Button 1338 executes the searching function. Area 1304 permits a user to choose a movie from retrieved results based on the movie name input in area 1302. As shown in FIG. 14, area 1404 provides a choice between two "hits" for the search terms of 1402. EDIT AND SAVE portion 1306 shows that a profile of the movie can be edited, updated or revised as shown by the data fields, which were described in relation to FIG. 13. The fields include: Title 1308, with fillable portion 1408; Release date 1310 with fillable portion 1410; Studio 1312 with fillable portion 1412; Rating 1314 with fillable portion 1414; Releasing Entity 1316 with fillable portion 1416; IMDB URL 1318 with fillable portion 1418; Synopsis 1320 with fillable portion 1420; AKA(s) 1322 with fillable portion 1422; Actors 1324 with fillable portion 1424; Directors 1326 with fillable portion 1426; Producers 1328 with fillable portion 1428; and Writers 1330 with fillable portion 1430.

As described in relation to FIG. 13, each field in EDIT AND SAVE portion 1306 may be revised and the revisions changed. The revisions, such as changing the release date will cause the display of release data, as described herein to be updated electronically so the display will reflect the revised information. Also, it is an embodiment of the present invention that a user, or administrator will identify themselves when making changes to the data records using these input techniques. This adds accountability and integrity as well as the ability to trace and track who is making particular changes and when the changes were made.

EDIT button 1434 permits a user to edit the information and CLOSE button 1336 permits a user to close out of this screen.

Figure 15:
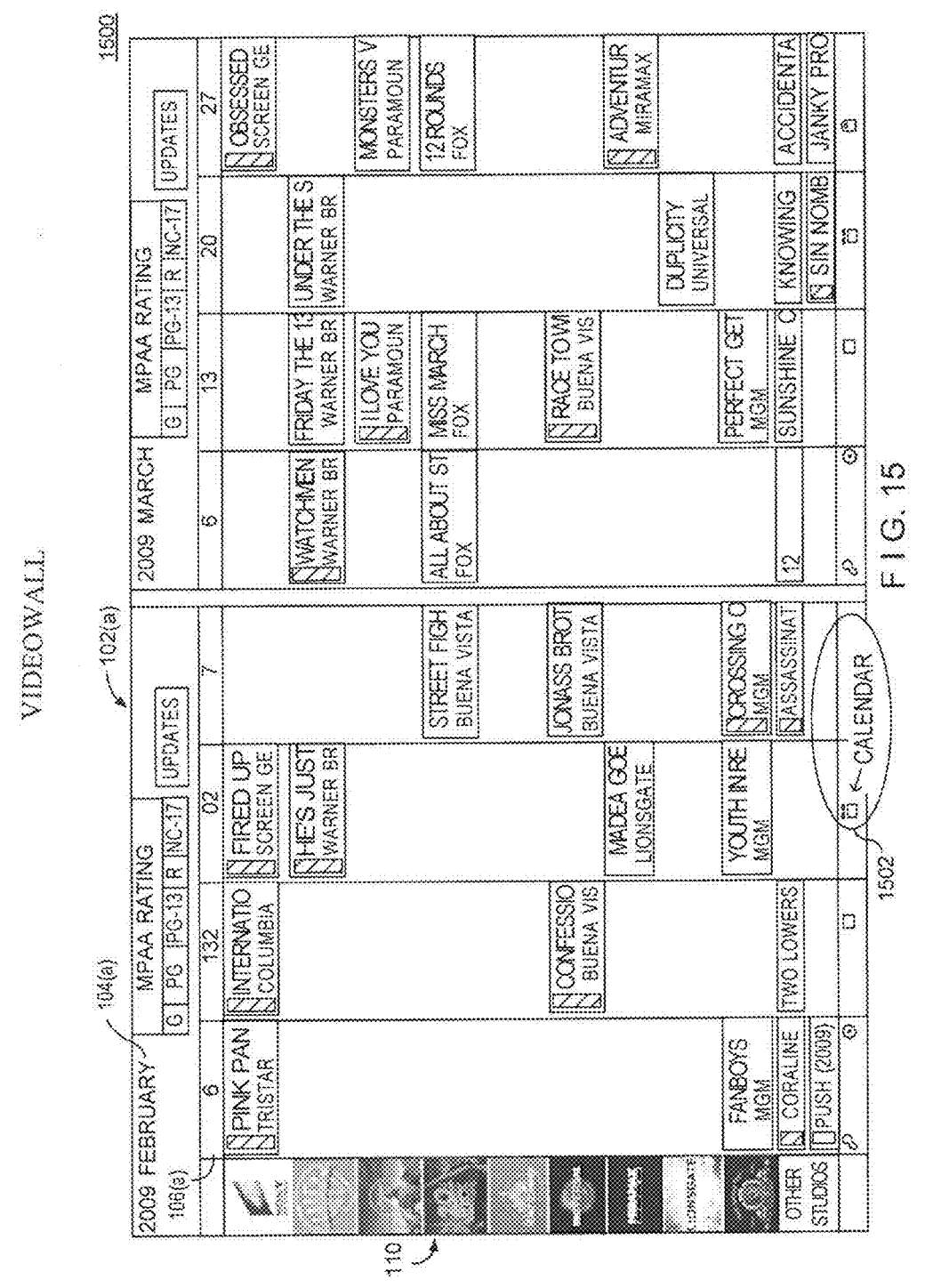

FIG. 15 shows an example 1500 of a calendar layout for release data according to an embodiment of the present invention. As shown in FIG. 15, calendar button, or area 1502 permits a user to return to the calendar view from the data view. (An example of the data view is shown in FIG. 14.) The other elements shown in FIG. 15 have been described previously (FIGS. 1 and 2) and are not repeatedly described in relation to FIG. 15.

FIG. 16 shows an example 1600 of a desktop login menu screen according to an embodiment of the present invention. As shown in FIG. 16, USER NAME portion 1602 and PASSWORD portion 1604 are fields required for a user or administrator to gain access to the CRB display and edit capabilities. RESET and LOGIN buttons, 1606 and 1608, respectively, are also shown in FIG. 16.

Figure 17:
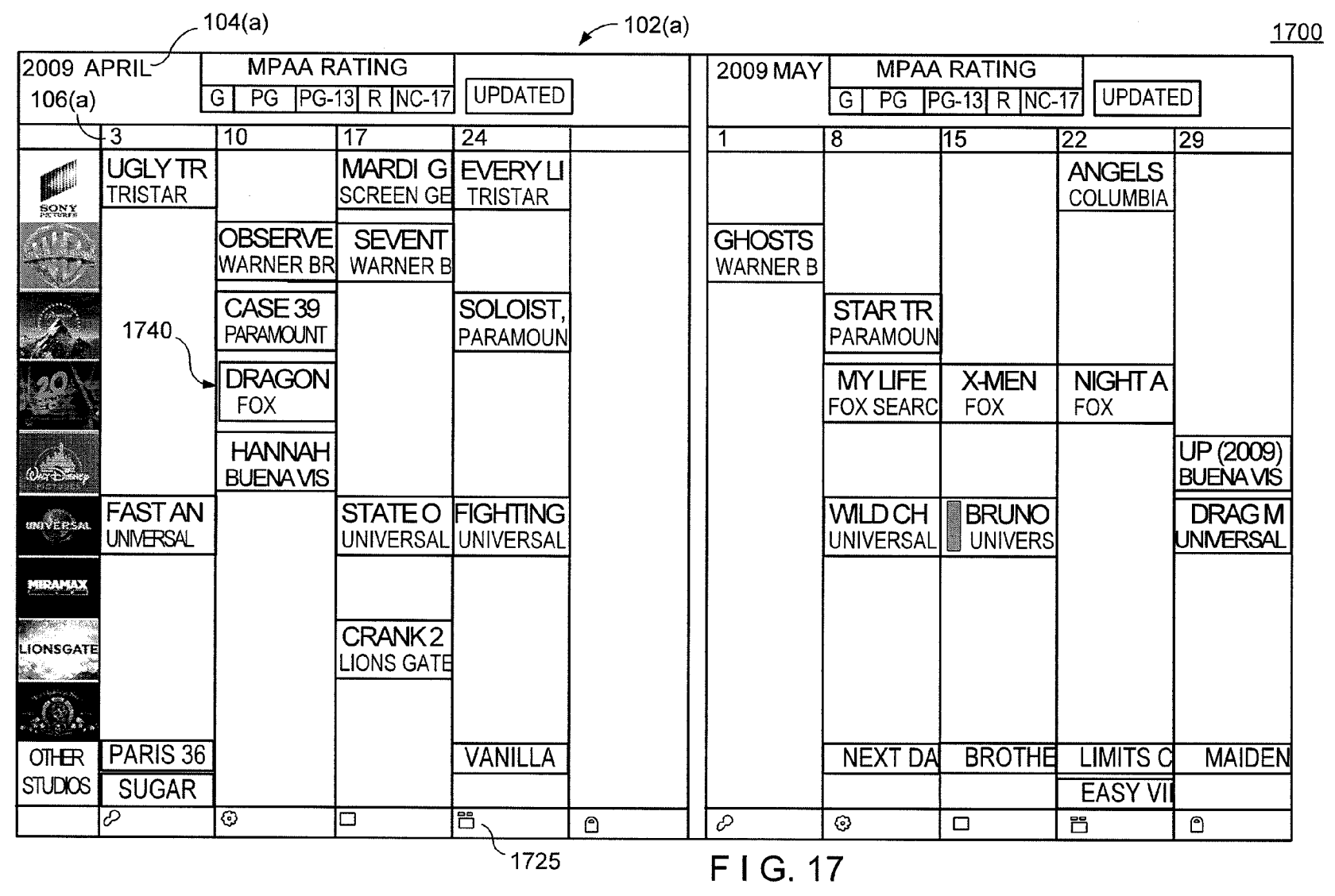
Figure 18:
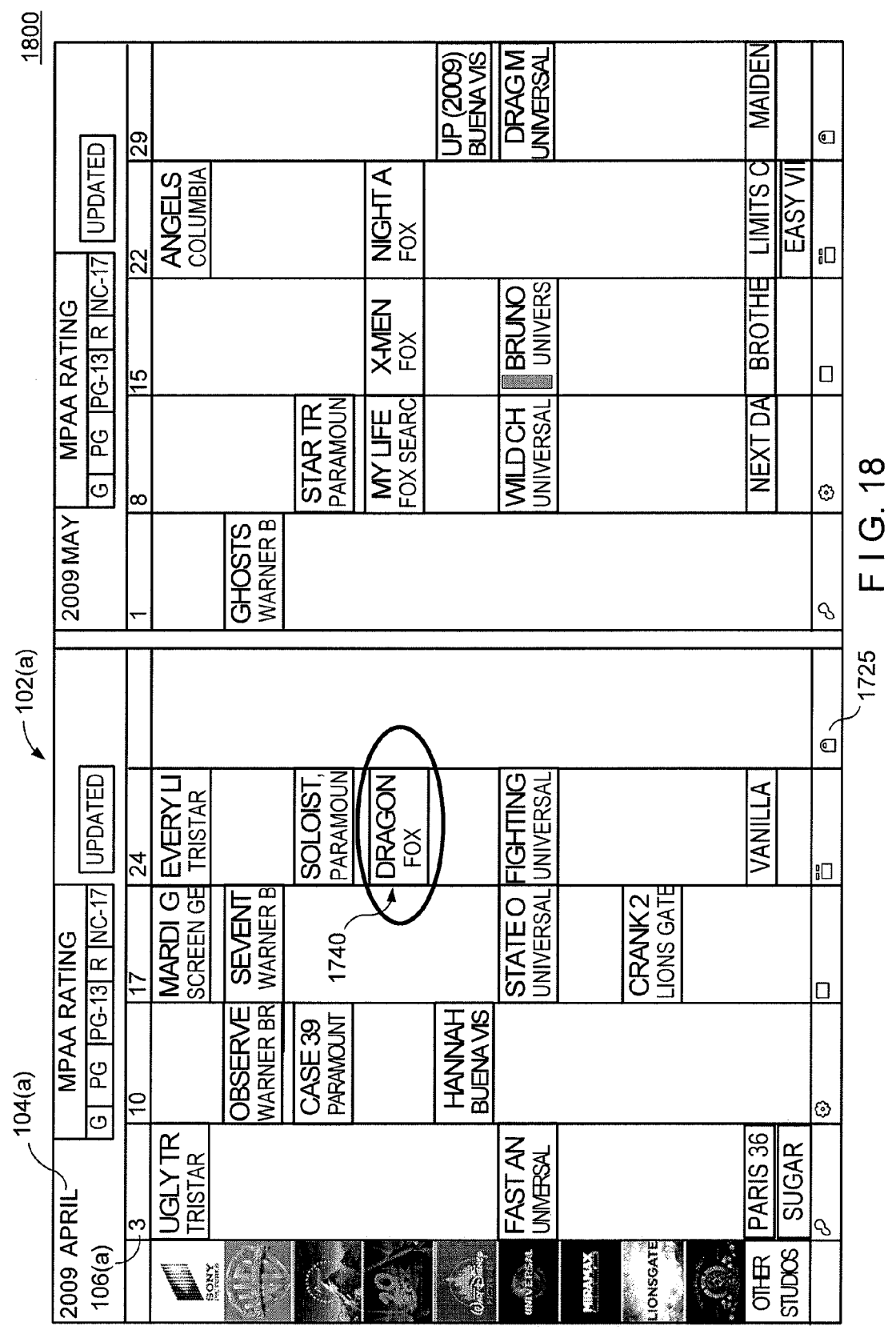

FIGS. 17 and 18 show an example of a layout for release data according to an embodiment of the present invention that is displayed on a desktop, or single display unit or device (desktop embodiment). FIGS. 17 and 18 are similar to FIG. 5. FIG. 17 shows an example of the CRB, which may be revised and/or updated by editing the tiles. Specifically, tile 1740 "Dragon" is shown as being released in the week of Apr. 10, 2009 in FIG. 17. As shown in FIG. 18, the tile 1740 is moved from a previous location (Apr. 10, 2009) t6o an updated release date of Apr. 24, 2009, thus indicating a change from a previous release date to a new position indicating a new release date. Furthermore, an indicator, such as changing the color of the tile 1740 indicates that the tile has been moved so as to be displayed in another portion of the display. Menu bar 1725 is displayed at the lower portion of the layout design in FIGS. 17 and 18 and provides a user the ability to navigate the display. As will be apparent, a user can edit the videowall, or desktop to move tiles from one month to another, or delete or add tiles as desired. The other elements have been described previously and are not repeatedly described.

Figure 19:
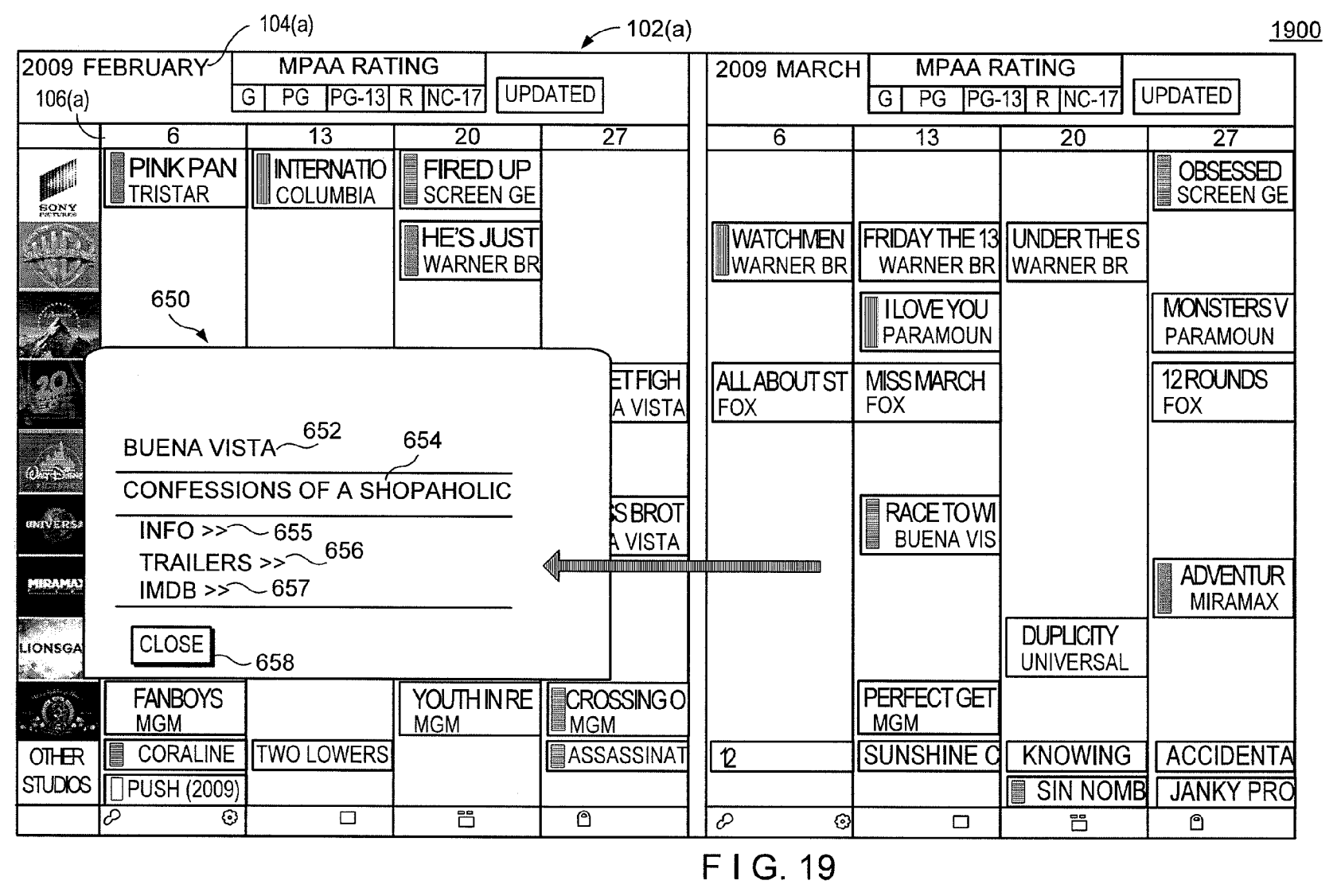

FIG. 19 shows an example 1900 of additional data displayed with the release data according to an embodiment of the present invention. FIG. 19 is an example of a display in the desktop embodiment and is similar to FIG. 6, described in relation to the videowall embodiments. Specifically, FIG. 19 shows that a user can access an information link, or area 650 that opens a window to permit a user to view additional data. For example, the studio 652, title 654, information 655, trailer 656, IMDB 657 and close button 658. These areas showing additional data may be accessed and edited and saved by a user. The other elements shown in FIG. 19 have been described previously and are not repeatedly described.

Figure 20:
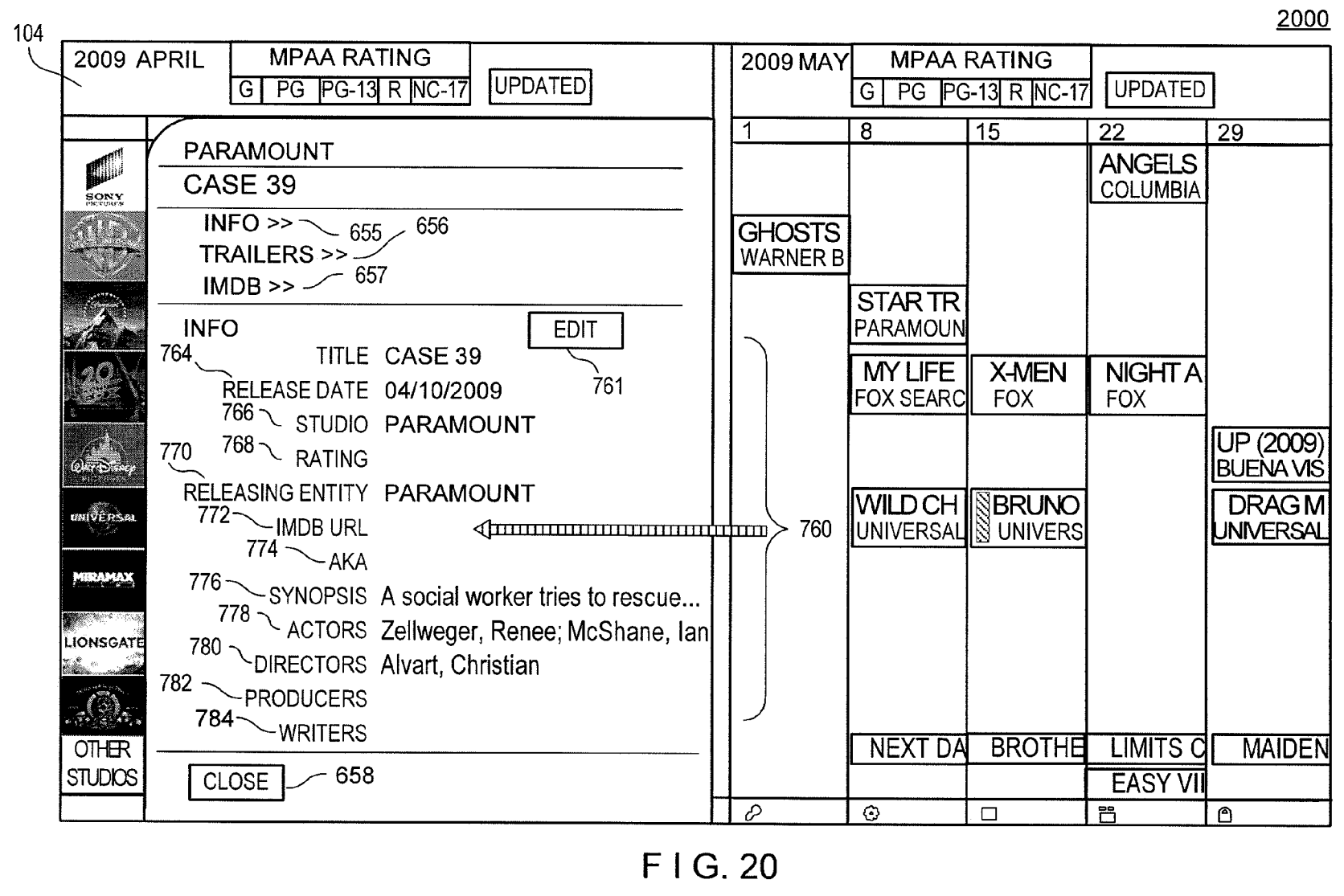

FIG. 20 shows an example 2000 of details associated with release data according to an embodiment of the present invention. FIG. 20 is an example of a display in the desktop embodiment and is similar to FIG. 7, described in relation to the videowall embodiments.

FIG. 20 shows an example of additional data that is accessed from an item of the release data according to an embodiment of the present invention. A user accesses or "clicks" the info link 655 inside the movie details window 650 to open a section that contains fields (generally shown as 760) including fields for: title 762; release date 764; studio 766; rating 768; releasing entity 770; IMDB URL 772; AKA 774; synopsis 776; actors 778; directors 780; producers 782; and writers 784. While the number of fields 760 may be more or less inclusive, than those shown in FIG. 7, each field 760 may be displayed and edited. Based on the edits, the location of the electronic tile may be adjusted. For example, revising the release date will cause the movie tile to be places at a different location on the monitor. Edit button 761 and close button 658 are also shown. The other elements shown in FIG. 20 have been described previously.

Figure 21:
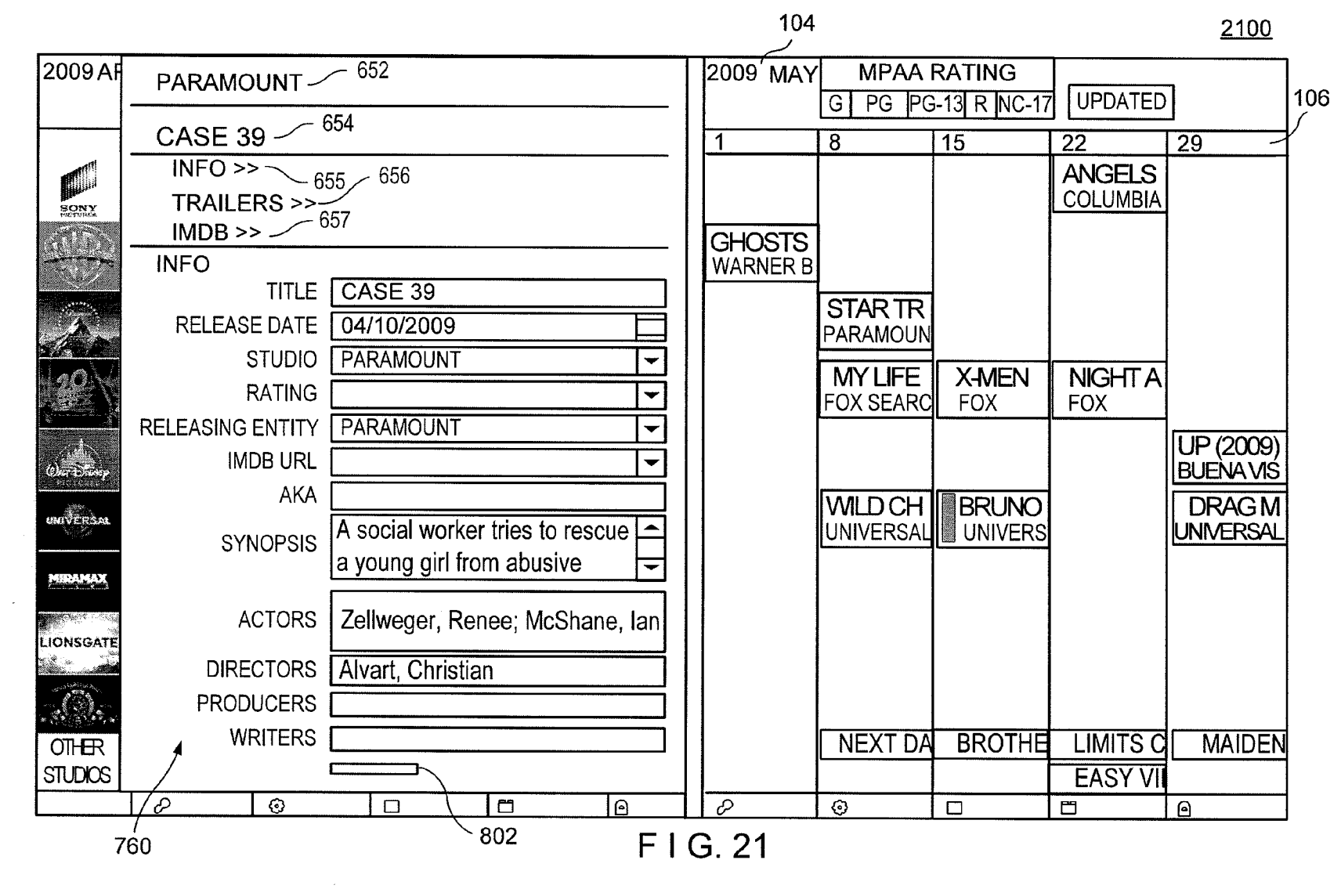

FIG. 21 shows an example 2100 of additional data associated with release data according to an embodiment of the present invention. FIG. 21 is an example of a display in the desktop embodiment and is similar to FIG. 8, described in relation to the videowall embodiments. FIG. 21 shows an example of a revision to the release data according to an embodiment of the present invention. In FIG. 21, once a user, or administrator clicks, or accesses the "edit" button (FIG. 7, element 761) the fields (generally shown as 760 and described in more detail in relation to FIG. 7) may be edited, revised or updated. "Save" button 802 can be accessed to save the edits. The other elements shown in FIG. 21 have been described previously.

Figure 22:
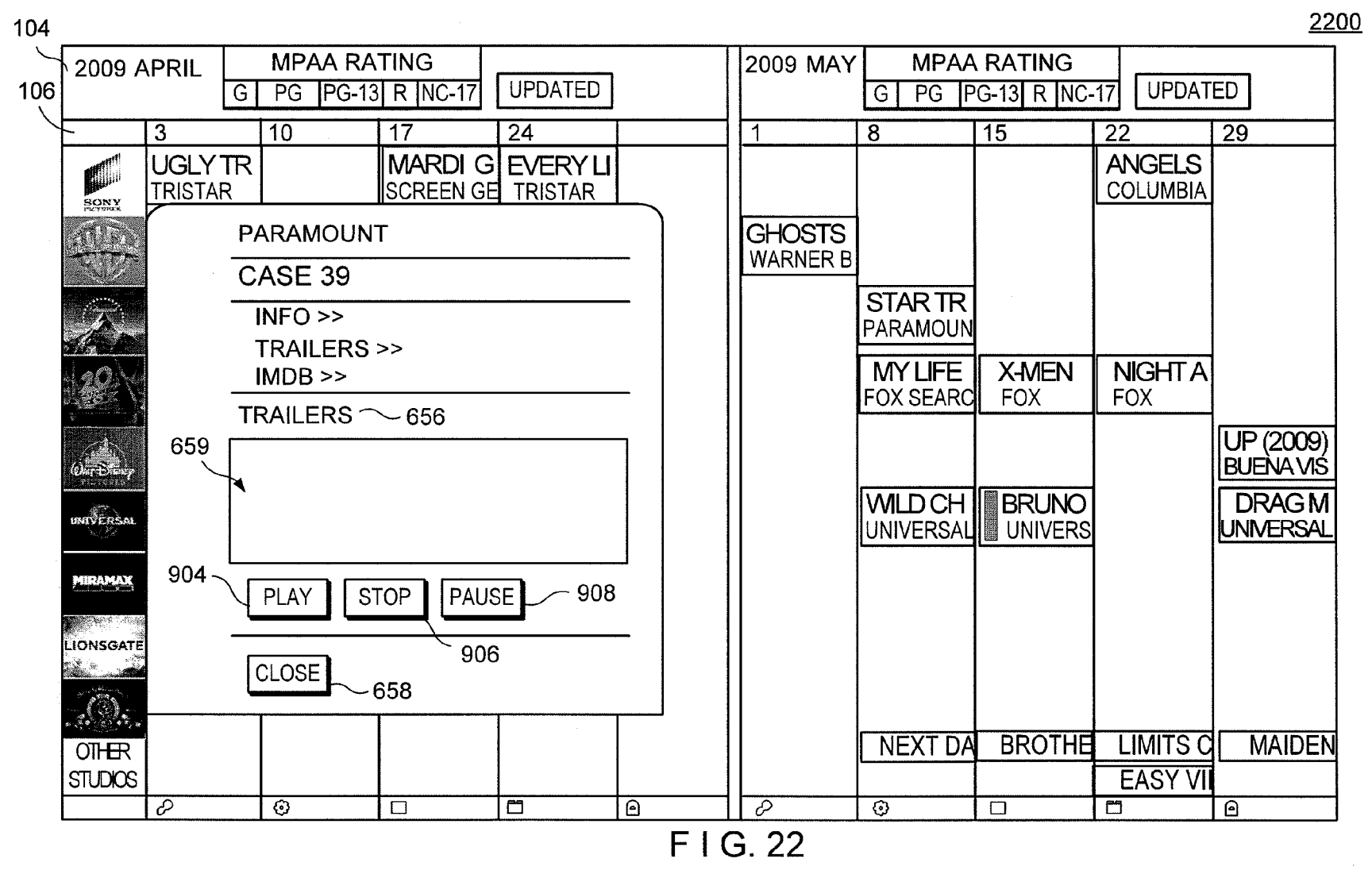

FIG. 22 shows another example 2200 of additional data associated with release data according to an embodiment of the present invention. FIG. 22 is an example of a display in the desktop embodiment and is similar to FIG. 9, described in relation to the videowall embodiments. FIG. 22 shows an example of trailer information that is displayed with release data according to an embodiment of the present invention. Users can play trailers by clicking on the trailers link 656 as described herein. Clicking on the trailers link, or button 656 will display a list of trailers for the associated movie title. PLAY button 904, STOP button 906 and PAUSE button 908 are also shown in FIG. 22. The trailer data 659 may be displayed on the single month display monitor or a different monitor. The trailer data 659 may be audio, visual, audio/visual, a download or other content. The trailer is displayed and played within the display of the month in a dedicated portion. The PAUSE button 908 can act as a toggle between pause and play functions. The other elements shown in FIG. 22 have been described previously.

Figure 23:
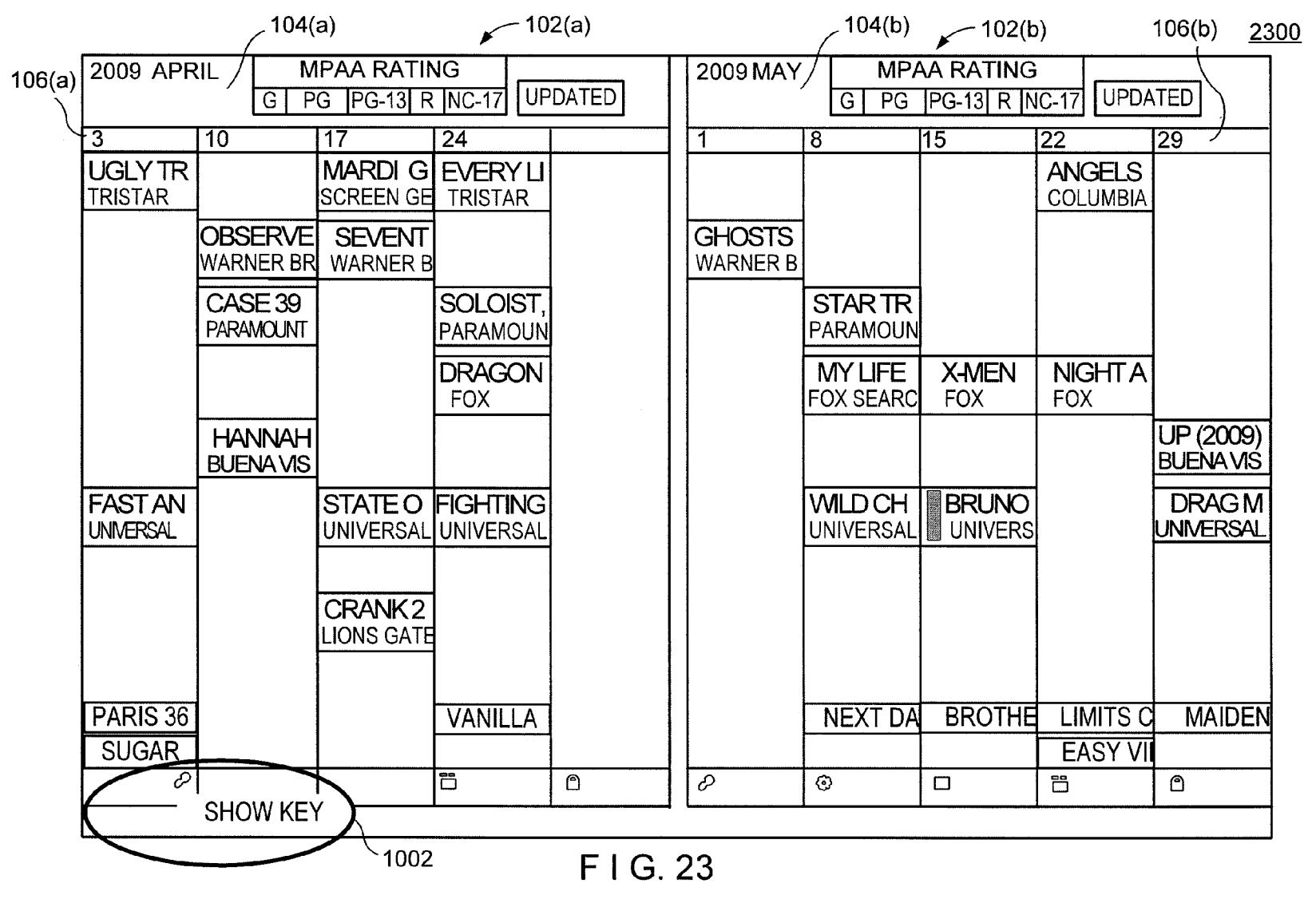

FIG. 23 shows an example 2300 of a layout for release data according to an embodiment of the present invention. FIG. 23 is an example of a display in the desktop embodiment and is similar to FIG. 10, described in relation to the videowall embodiments. FIG. 23 shows a "HIDE/SHOW" functionality. An icon 1002 controls whether or not the display includes information such as the studio releasing the movie. When the "HIDE" function is activated, the display for a month will not show the studio, as shown in FIG. 10. When the "SHOW" function is activated the studio associated with a release will be displayed. The other elements shown in FIG. 23 have been described previously.

Figure 24:
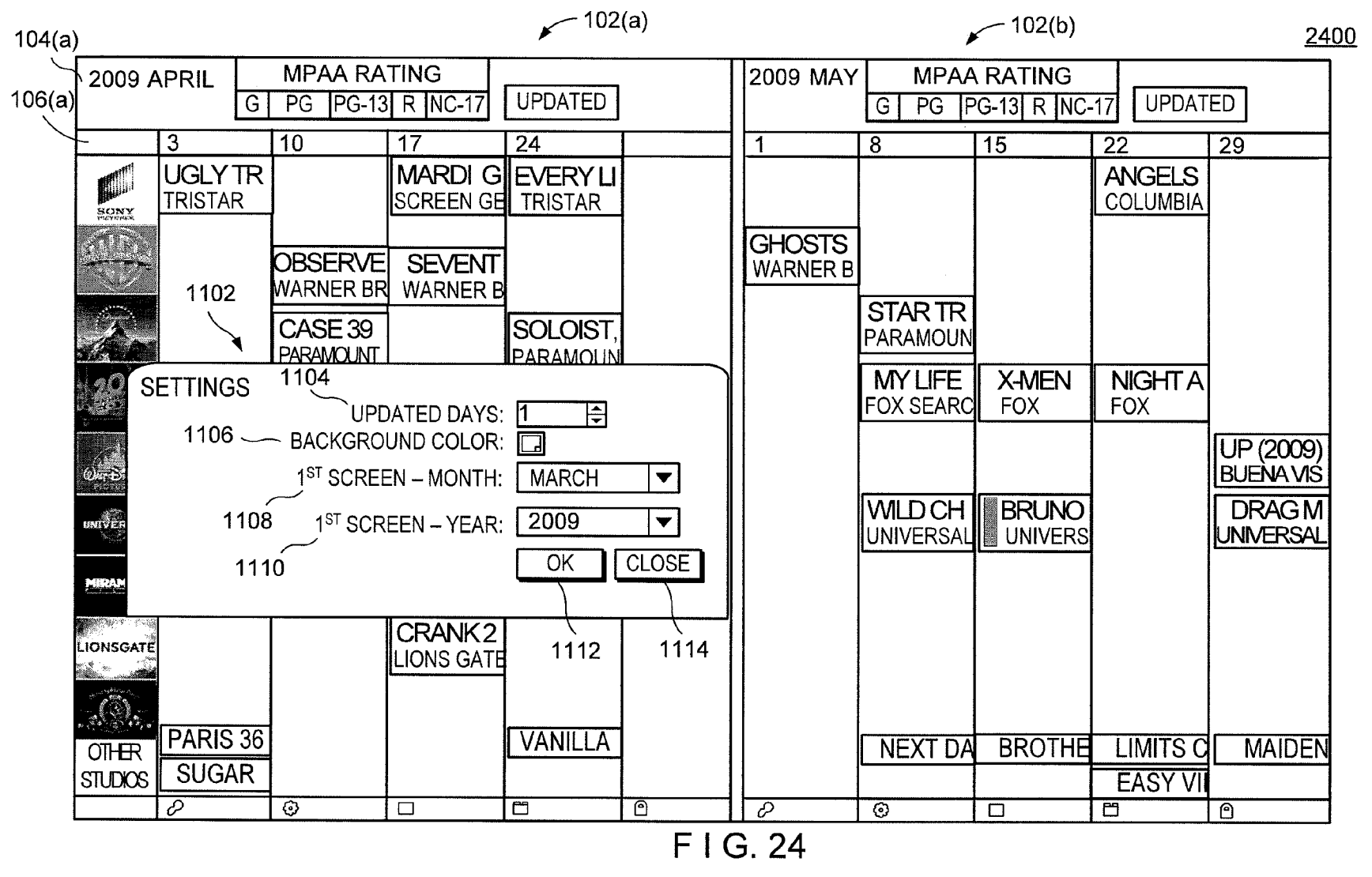

FIG. 24 shows an example 2400 of settings associated with release data according to an embodiment of the present invention. FIG. 24 is an example of a display in the desktop embodiment and is similar to FIG. 11, described in relation to the videowall embodiments. As shown in FIG. 24, Settings area, or box, or section 1102 provides a user or administrator with the ability to change the number of days a movie maintains updated status, such as a color indicator, as shown by area 1104. Area, or button 1106 shows that a user or administrator can change the background color of the screen. Area or button 1108 and 1110 show that the month (1108) and year (1110) can be modified. Button 1112 is an accept button and button 1114 is a close button. The other elements shown in FIG. 24 have been described previously.

FIG. 25 shows an example 2500 of data views according to an embodiment of the present invention. FIG. 25 is an example of a display in the desktop embodiment and is similar to FIG. 12, described in relation to the videowall embodiments. FIG. 25 shows an example 2500 of titles associated with release data according to an embodiment of the present invention. All titles area 1202 shows that titles are being displayed. The titles are listed as shown by 1204(*a*) . . . (*n*) (where "n" is any suitable number), an associated studio 1214(*a*) . . . (*n*), an associated production company 1216(*a*) . . . (*n*), an associated release date 1218(*a*) . . . (*n*) and an associated rating 1220(*a*) . . . (*n*). An "ADD" button 1240 permits a user or administrator to add an entry. Area, or button, 1206 shows that the information may be sorted and displayed according to releasing entity. Area, or button, 1208 shows that the information may be sorted and displayed according to titles with a release date. Area, or button, 1210 shows that the information may be sorted and displayed according to titles that do not have a release date. Area, or button, 1212 shows that the information may be sorted and displayed according to an archive of title information. The other elements shown in FIG. 25 have been described previously.

Figure 26:
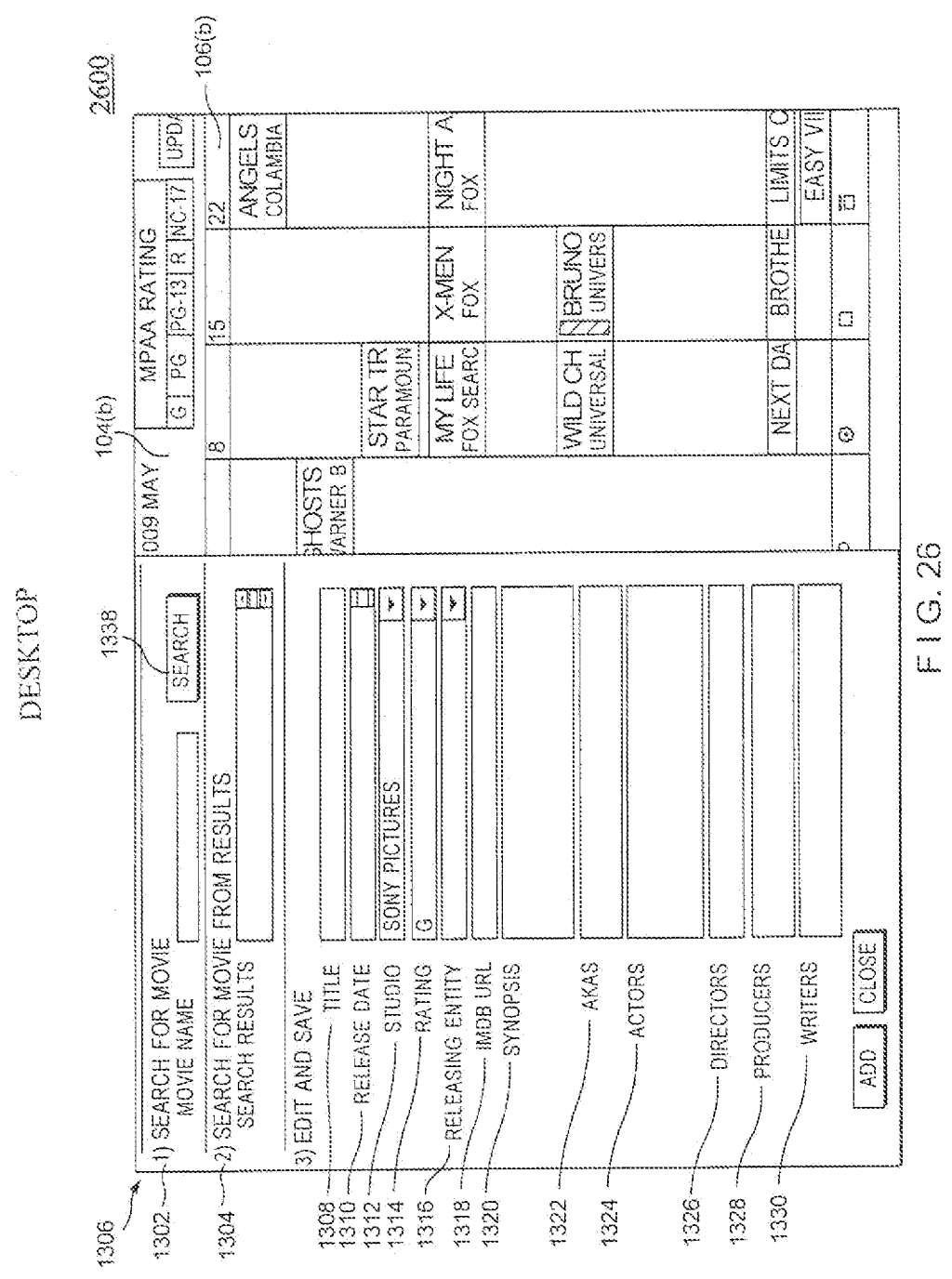

FIG. 26 shows an example 2600 of details associated with release data according to an embodiment of the present invention. FIG. 26 is an example of a display in the desktop embodiment and is similar to FIG. 13, described in relation to the videowall embodiments. FIG. 26 shows an example 2600 of a GUI used to add data for the CRB according to an embodiment of the present invention. Area 1302 shows a field to search for a particular movie. Button 1338 executes the searching function. Area 1304 permits a user to choose a movie from retrieved, results based on the movie name input in area 1302. EDIT AND SAVE portion 1306 shows that a profile of the movie can be edited, updated or revised as shown by the following data fields: Title 1308; Release date 1310; Studio 1312; Rating 1314; Releasing Entity 1316; IMDB URL 1318; Synopsis 1320; AKA(s) 1322; Actors 1324; Directors 1326; Producers 1328; and Writers 1330, Each field in EDIT AND SAVE portion 1306 may be revised and the revisions changed. The revisions, such as changing the release date will cause the display of release data, as described herein to be updated electronically so the display will reflect the revised information. Also, it is an embodiment of the present invention that a user, or administrator will identify themselves when making changes to the data records using these input techniques. This adds accountability and integrity as well as the ability to trace and track who is making particular changes and when the changes were made.

ADD button permits a user to add additional information and CLOSE button permits a user to close out of this screen. The other elements shown in FIG. 26 have been described previously.

FIG. 27 shows an example 2700 of settings associated with release data according to an embodiment of the present invention. FIG. 27 is an example of a display in the desktop embodiment and is similar to FIG. 14, described in relation to the videowall embodiments. FIG. 27 shows an example 2700 of a search feature used to search data according to an embodiment of the present invention. FIG. 27 is similar to FIG. 26 with the difference being the fields are shown as containing data. Area 1302 shows a field to search for a particular movie, similar to FIG. 26. Area 1402 shows that the first portion of a title is input. Button 1338 executes the searching function. Area 1304 permits a user to choose a movie from retrieved results based on the movie name input in area 1302. As shown in FIG. 27, area 1404 provides a choice between two "hits" for the search terms of 1402. EDIT AND SAVE portion 1306 shows that a profile of the movie can be edited, updated or revised as shown by the data fields, which were described in relation to FIG. 26. The fields include: Title with fillable portion 1408; Release date with fillable portion 1410; Studio with fillable portion 1412; Rating with fillable portion 1414; Releasing Entity with fillable portion 1416; IMDB URL with fillable portion 1418; Synopsis with fillable portion 1420; AKA(s) with fillable portion 1422; Actors with fillable portion 1424; Directors with fillable portion 1426; Producers with fillable portion 1428; and Writers with fillable portion 1430.

As described in relation to FIG. 26, each field in EDIT AND SAVE portion 1306 may be revised and the revisions changed. The revisions, such as changing the release date will cause the display of release data, as described herein to be updated electronically so the display will reflect the revised information. Also, it is an embodiment of the present invention that a user, or administrator will identify themselves when making changes to the data records using these input techniques. This adds accountability and integrity as well as the ability to trace and track who is making particular changes and when the changes were made.

EDIT button 1434 permits a user to edit the information and CLOSE button 1336 permits a user to close out of this screen. The other elements shown in FIG. 27 have been described previously.

Figure 28:
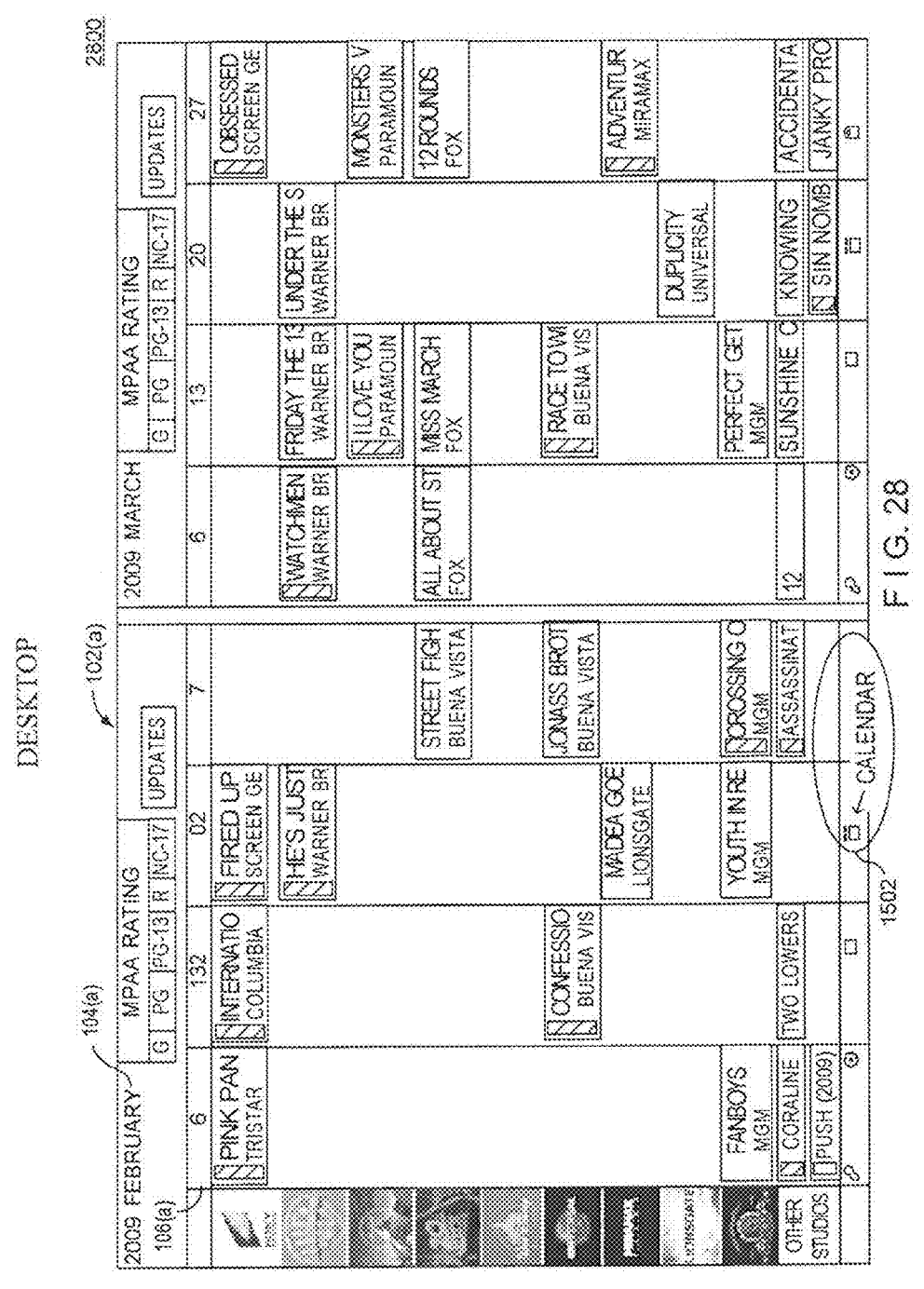

FIG. 28 shows an example 2800 of titles associated with release data according to an embodiment of the present invention. FIG. 28 is an example of a display in the desktop embodiment and is similar to FIG. 15, described in relation to the videowall embodiments. FIG. 28 shows an example 2800 of a calendar layout for release data according to an embodiment of the present invention. As shown in FIG. 28, calendar button, or area 1502 permits a user to return to the calendar view from the data view. (An example of the data view is shown in FIG. 14.) The other elements shown in FIG. 28 have been described previously.

Figure 29:
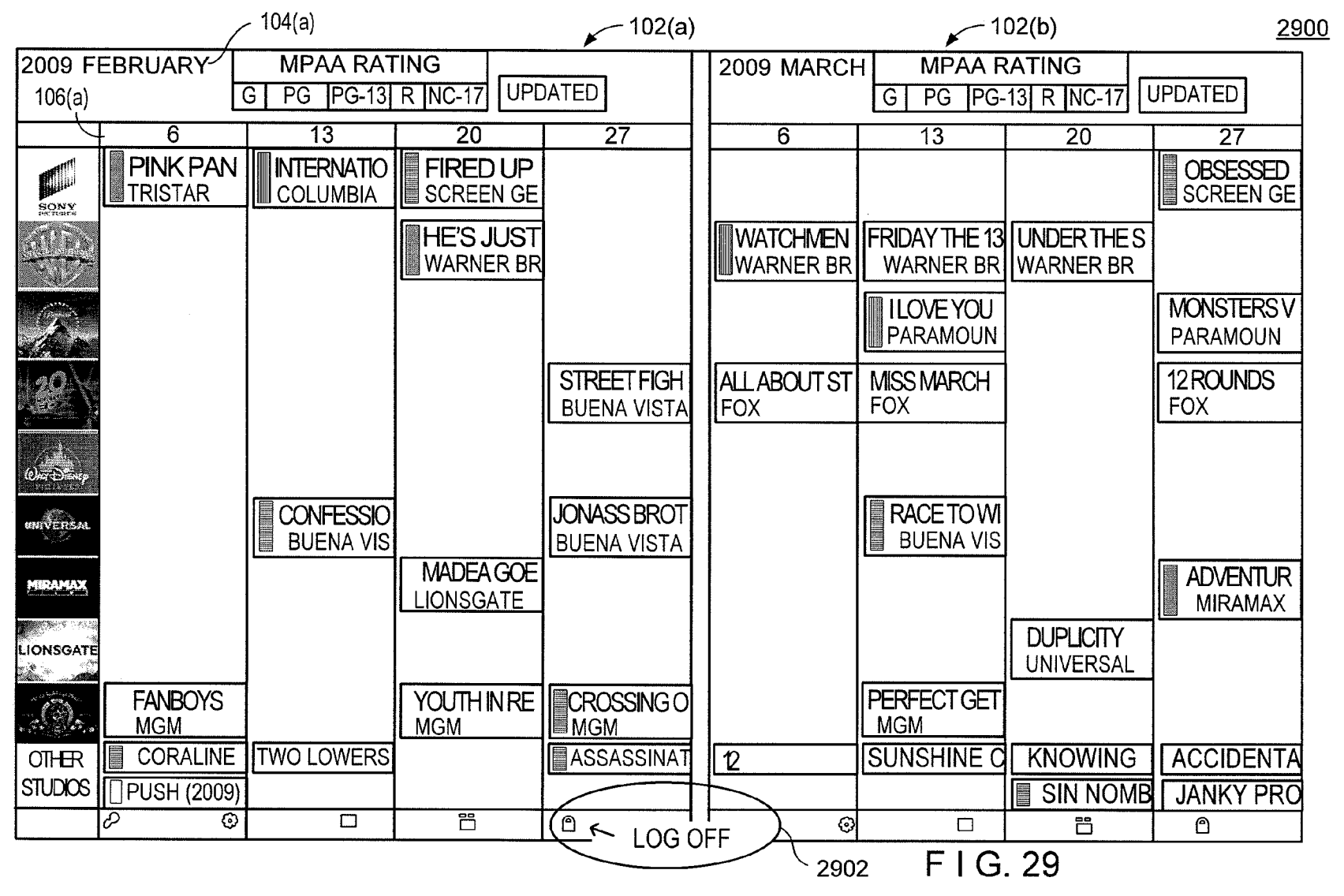

FIG. 29 shows an example 2900 of a calendar display that includes a "LOGOFF" button 2902. The LOGOFF button 2902 permits a user to terminate operation of the display system and save any changes that were made. The other elements shown in FIG. 29 have been described previously.

Figure 30A:
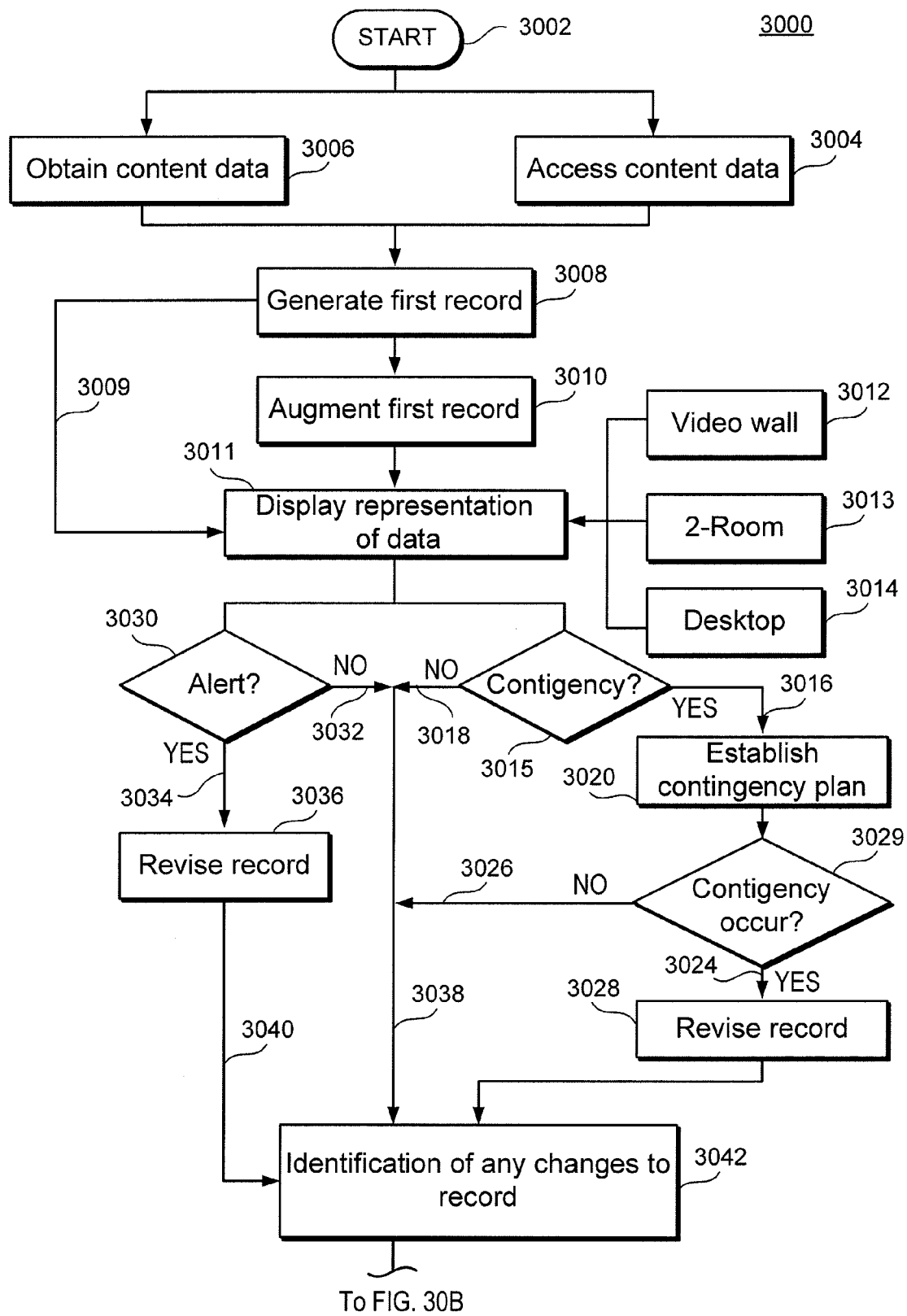
FIG. 30 shows an example of a flowchart according to an embodiment of the present invention.
Figure 30B:
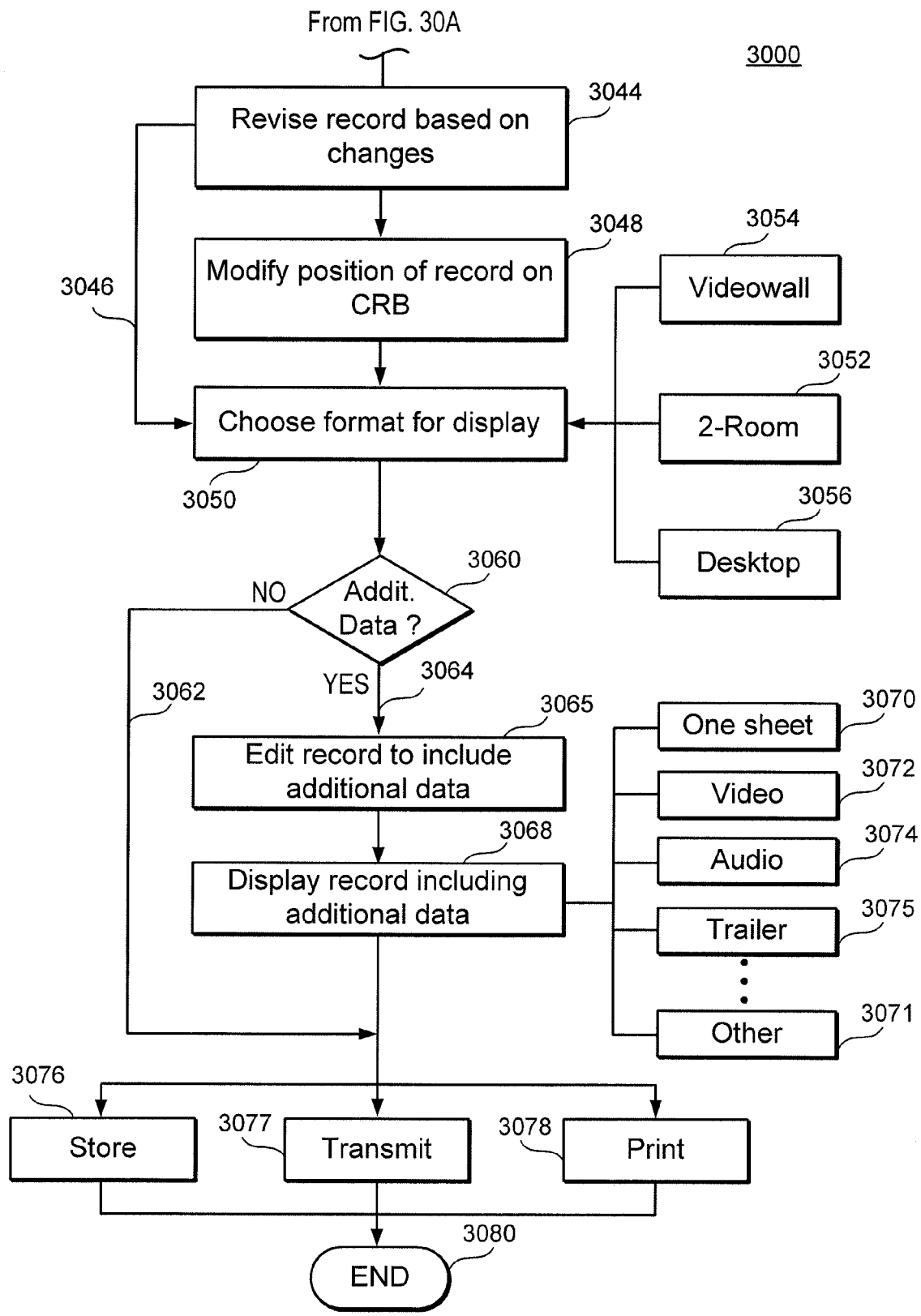

FIG. 30 shows an example 3000 of a flowchart, or series of steps, that may be used to create, edit, modify revise or otherwise populate a record for the present invention. As shown in FIG. 30, the series of steps may be represented as a flowchart 3000 that may be executed by a processor, or otherwise executed to perform the identified functions and may also be stored in one or more memories and/or one or more electronic and/or computer-readable media. These one or more media may be non-transitory media as well as stored in a manner that permits transmission of the data to one or more remote locations. For example, the steps of FIG. 30 may be stored on a computer-readable medium, such as ROM, RAM, EEPROM, CD, DVD, or other non-volatile memory. The program code stored on an electronic memory medium is a structural element.

The process 3000 begins with start step 3002. Step 3004 shows that event data is accessed. This data may include event release dates, titles or other descriptive information about the event, time and place of release as well as a type of medium, such as television, print, webpage, live event, audio, or text, among others. The event data is typically associated with a particular event, although it could also relate to a sequence or series of events (e.g., an on-going television show, a multi-stop concert tour, playoff games and multi-day and multi-venue events such as World Series, Stanley Cup, and the like.

Accessing data may include, for example, obtaining information such as event release dates, such as production and release schedules from a database, repository or other source. One example of such a source is IMDB (Internet Movie Data Base). This accessing may be for example an automated download of information.

In addition, or alternatively, as shown in step 3006, data may be obtained from a keyboard, mouse or other user input device in conjunction with a GUI. The accessed and/or obtained content data is used to generate a first record, as shown in step 3008. An example of the first record is a movie title and a release date. A representation of the first record may then be displayed, as shown in step 3009 leading to display step 3011, for example on a monitor (either videowall and or desktop and/or at a number of locations) according to a release date. (An example of this display is shown in FIG. 2.) As shown in FIG. 30, the first record may be augmented to include additional data, as shown in step 3010. The additional data used to augment the first record may be, for example, studio information, rating information, releasing entity, IMDB URL, AKA information, synopsis, actors, directors, producers and writers. (This additional information is shown in relation to FIG. 7.)

Step 3011 shows that a representation of the content data is displayed. This representation may include the augmented data or may not include the augmented data. A format for the displaying step may be selected from any suitable format; however, three examples of possible formats are shown as videowall (3012), multiple venue (3013) and desktop (3014). Any combination of formats may be used based on user preference. Indeed, different formats may be used simultaneously.

Step 3015 determines whether there is a contingency condition relative to a particular record. A contingency is an event that may impact a release date or scheduled happening. For example, a movie studio may not wish to release a new movie on the same day as game 7 of a World Series. However, depending on the outcome of the first 5 games of the World Series, a game 6 or game 7 may not occur. The present invention provides the ability to identify possible conflicts and establish contingency plans to avert a conflict with a release.

As shown by, "YES" line 3016, indicating there is a possible conflict, step 3020 that establishes a contingency plan or response to a possible activity (e.g. game 7 of the World Series is needed), is reached. For example, the contingency plan of step 3020 may include a second choice release date or moving other release dates.

Step 3029 determines whether the contingency or potential conflict will occur. If so, "YES" line 3024 shows that a revision of the date of release occurs, step 3028, This revision will cause the representation on the display to be moved. For example, if a game 7 of the World Series is needed and there is a conflict with a scheduled movie release, the day or the movie release can be revised and then the revised representation will be displayed on the display (videowall desktop) in the release slot.

If there is no potential conflict, or contingency, "NO" line 3018 joins with line 3026, indicating that the contingency did not occur (e.g., game 7 of the World Series was not needed).

Step 3030 shows that an alert condition may be used with the present invention. An alert condition may be, for example, a competing release or holiday or other information that has been identified as impacting the proposed event release. Specifically, a movie studio may not wish to release a new movie over a holiday or other possible conflict. Unlike a contingency condition, which may or may not occur, the alert situation will determine a known possible conflict. If the alert condition is not a problem or issue, or does not exceed an alert threshold, "NO" line 3032 leads to line 3038. If there is an alert, "YES" line 3034 leads to step 3036 in which the release date as well as other records or parameters or additional data may be edited or revised. Line 3040 shows that step 3042 is reached.

Following the identification and resolution of contingencies and alerts, step 3042 is reached in which an identification of all changes, if any, made to a data record as a result of alerts and/or contingencies is performed. Step 3044 shows that one or more portions of the data record may be revised. This may involve revising a release date, which means that the position on any displays will be changed, as shown in step 3048. If there are no changes to the position on a display, line 3046 shows that step 3050 is reached. Step 3050 shows that the format of display of the data record may be selected. This format may include any suitable format such as videowall (3054), two-room (3052) and desktop (3056). As stated previously, a combination of display formats may be used either sequentially and/or simultaneously.

Step 3060 determines whether additional data should be included with the data record. If so, "YES" line 3064 leads to step 3065 that shows the data record is edited to include the additional data. Step 3068 shows that additional data, for example, a one-sheet (static and/or video) (3070), video data (3072), audio data (3074), trailer information (3075) or other additional data (3071), is displayed with the data record. Following the display step 3068 are output operations: store (3076); transmit (3077); and/or print (3078) the record and/or the display of representations.

If there is no additional data, "NO" line 3062 leads to an output operations sequence that include, for example store (3076); transmit (3077); and/or print (3078) the record and/or the display of representations.

End step 3080 is reached following the output operations sequence.

FIG. 31 shows an example of additional data related to a release according to an embodiment of the present invention. As shown in FIG. 31 a single display sheet 3100 includes image data 3102 that is static (i.e., still or not moving) and also has the capability to have video data so that the image data 3102 appears to "move" thus giving the impression that the still image is alive, a living one-sheet. Activation of the video can be achieved by a motion sensor or timer. Text 3104 can also be included in the living one sheet 3100. The text can also changed based on motion and/or time and/or activation of the image 3102.

FIG. 32 shows an example 3200 of a multi-venue display embodiment of the present invention. This embodiment permits display of portions of the record data at more than one location. Users at each location can determine what portions they wish to view. A first venue, such as a conference room, 3204 can view a first selected version of the record data 102(a) and 102(d) representing, for example, two months one release data (FIG. 1 also shows months represented by 102(a) and 102(b).) A second venue 3206, such as a different conference room or a different location, can view a second version of the data, for example a month 102(b) and a month 102(c). The two venues 3204 and 3206 may be operatively coupled via bi-directional link 3250 and/or coupled to processing module 402 via a network 404, which may be an intranet, Internet or other network of processing devices, or coupled to processing module 402 independent of a network. Any revisions made to either subset will be saved to the memory for the associated data record. Thus, a group of users in one venue can "CHECK-OUT" a month of representations, and modify the records. This modified month can then be viewed by users at other venues. Modifications made to any field will propagate through the entire data set.

Figure 33:
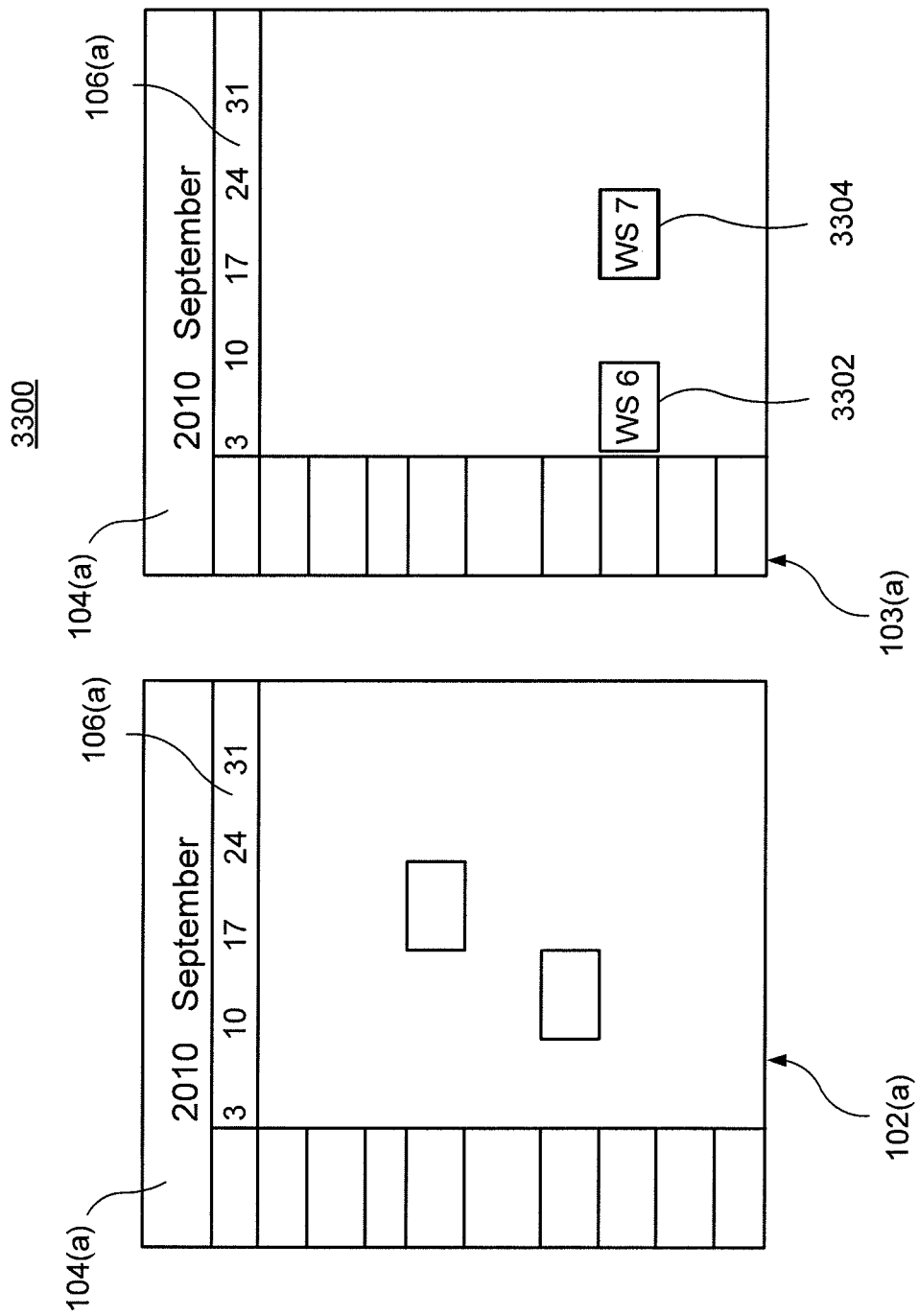
FIG. 33 shows an example of a display that includes contingency conditions according to an embodiment of the present invention.

FIG. 33 shows an example of a display 3300 that includes contingency conditions according to an embodiment of the present invention. As shown in FIG. 33, display module 102(a) shows a plurality of representations of upcoming release dates and products. This is similar to the representations shown in FIG. 1 and FIG. 2. Representation 103(a) is an example of a contingent condition. Specifically contingent condition 3302 shows that game 6 of the World Series may occur on a calendar day. Similarly, contingent condition 3304 shows that game 7 may also be played on a particular day. Using these contingent conditions 3302, 3304, the display 102(*a*) may be adjusted or modified to reflect a desire not to conflict with these potential events shown in display 103(*a*).

In another embodiment, the system and method can permit a display or display scheme for the CRB such that it behaves to the user as a single application, and provides functionality therein.

For example, an application development and launching tool can be employed to launch a plurality of individual display modules each having independent functionality including such functions as described herein. For instance a tool such as those known by ordinarily skilled artisans, such as for example Adobe® AIR® technology, can be employed to launch an individual popup windows such as "NativeWindows." A single application, the execution of which is not visible to the user can be configured to launch a plurality of these display modules. For example a single, invisible "WindowedApplication" can be employed to launch a plurality of the NativeWindows. The display modules (e.g., such as the "Native Windows") can then be positioned in series and given sequential identifiers such that it appears to a user as a single, continuous or coherent image. Further, code can be provided in the single application to permit the functions in each display module to cooperate such that a change in one is communicated or accessible to the other. For example, the NativeWindows can be given sequential identifiers so various functions know where other functions and objects live and how to make them behave as a single application. Thus the multiple display images and applications therefor behave as a single application. For instance, code can be provided in the core WindowedApplication to move the entire set of NativeWindows to create a "scrolling" image.

Thus, returning to FIG. 3 for example the single display device 300 display screen 330 may be configured to display multiple months 102(*a*) . . . (*n*) of release data on a single device in series. The months may be launched in a plurality of windows (e.g., one for each month) as described above. Then each of the windows can include the various functionalities for each month 102 as described throughout, and code can be provided to allow "handshake" interaction between the windows so that a change in one month 102(*a*) can be reflected in the months for the other windows 102(*b*) . . . 102(*n*). Also, the series can be sequentially configured and identified such that all the months 102(*a*) . . . (*n*) need not fit on the on the screen at once, but can be scrolled by a user. To the user the plurality applications and windows appear and behave as a single application and a seamless presentation. Thus the entire CRB application could be made "scrollable" on one or more display devices.

Other capabilities of the embodiment can allow, for example, the display of the CRB a single application on a display surface that is smaller that the CRB image. For example, a virtual screen of 32,400 pixels in width can be displayed on a display screen having 12,960 pixels in width. Another capability is the ability to achieve the display of pixel distributions that are relatively larger than the display screen width, even when there are program limitations such as pixel limits for an application running the display. For instance, the embodiment can allow for a virtual screen of 32,400 pixels in width to be displayed on a display screen having 12,960 pixels in width even with a 2,880 pixel limit (e.g., for Flash Movies).

FIG. 34 shows an example 3400 of a processor with peripherals used to implement embodiments of the present invention. The above-mentioned series of processes can be embodied by hardware, or by software, or by a combination thereof. When the processes are performed by software, a computer program is installed and executed in a memory of a computer assembled into dedicated hardware. Alternatively, the computer program may be installed and executed in a general-purpose computer capable of various processes.

A CPU (Central Processing Unit) 3461 performs various processes in accordance with computer programs stored in a ROM (Read Only Memory) 3462 or a storage unit 3482.

The computer programs executed by the CPU 3461 or data used therein are properly stored in a RAM (Random Access Memory) 3463. The CPU 3461, the ROM 3462, and the RAM 3463 are connected to each other via a bus 3464.

An input and output interface 3465 is connected to the CPU 3461 via the bus 3464. A user interface unit 3466 such as a touch panel, a keyboard, a mouse, and a microphone, an input unit 3468 for inputting an image signal, and an output unit 3470 including a display are connected to the input and output interface 3465. The CPU 3461 performs various processes using image signals input from the input unit 3468 in response to commands input from the user interface unit 3466. The CPU 3461 outputs the processing results to the output unit 3470.

The storage unit 3482 connected to the input and output interface 3465 includes, for example, a hard disk and stores computer programs executed by the CPU 3461 or various data. A communication unit communicates with an external device via a network such as the Internet or a local area network or a wired or wireless communication medium such as digital broadcast.

When a removable medium 3490 is mounted, a drive 3480 drives the removable medium and acquires stored computer programs or data stored therein. The acquired computer programs or data are transmitted to the ROM 3462, the RAM 3463 or the storage unit 3482, if necessary.

The computer programs are stored in advance, for example, in a hard disk or a ROM (Read Only Memory). Alternatively, the computer programs may be stored (recorded) temporarily or permanently in the removable medium 3490 such as a flexible disk, a CD-ROM (Compact Disc Read Only Memory), a MO (Magneto-Optical) disc, a DVD (Digital Versatile Disc), a magnetic disk, and a semiconductor memory, and may be read by the drive 3480. The computer programs may be transmitted to a computer from a download site by wireless or may be transmitted to the computer via a network such as a LAN (Local Area Network) or the Internet by wire. The computer may receive the computer programs transmitted via the communication unit 3475 and install the received computer programs in a recording medium such as a built-in hard disk.

Various examples and embodiments of the present invention are now described with reference to various figures as described herein.

As stated previously, embodiments of the present invention are directed to a method for creating a CRB that may be directed to movie production releases, sporting events, concerts, shows, television programs, album releases, or any other event that is introduced to the public. The CRB involves accessing content data from one or more sources of content data. These sources could be IMDB, a keyboard, a mouse, a data download, or a user adding information about release dates and studios and titles of the release. The processing module then generates a data record from the content data. This data record may be a file that includes a title and a proposed release date. This data record may also include additional data related to the title such as stars, writers, producers, rating (i.e., "G", "PG", "PG-13" "R" and "NC-17") a trailer, a one-sheet (static and/or video), audio data, video data, text data, promotional data, a soundtrack, promotional information, marketing programs, print advertising or any other content associated with the product. The additional data can be considered augmented data. The augmented data can be stored such that accessing the data record displays the additional data, which can be edited, revised and/or deleted.

The data record can be represented by a first representation that typically includes just the title. The first representation is disposed on an electronic CRB at a position reflecting the date of release. The electronic CRB may be a videowall (for example, a series of 12-18, or any suitable number 52" monitors positioned so that each monitor displays a one-month amount of release data). Alternatively, the electronic CRB may be a desktop version that displays a period of time (e.g., 12-18 months of release data) on a single monitor or display device.

The first data record can be accessed, or opened, to display additional data associated with the first data record. This is shown, for example, in FIG. 6. The additional data can be revised, for example the release date may be changed if the production is not complete or another release or other event is scheduled for the same time. Also, the stars may be changed if there has been a change in who is appearing in the production. When the release date is changed, the location of the electronic representation will change so that it corresponds to the new release date on the display.

The CRB also is adapted to identify contingency conditions that impact the release data. These contingency conditions may be identified an displayed relative to the month that they pertain (FIG. 30). The contingency conditions can be added to the data record as augmented data or flagged with a separate identifier. The identification of contingency conditions may be used when determining a release date of a production. The contingency feature also considers that the contingent event may not occur, in which case there is no need to reschedule the release date.

The CRB also identifies alert conditions. These alert conditions are conditions that may impact whether the scheduled release date is favorable based on other external events. For example, a release date that falls on a leap year, or national holiday may be revised to maximize exposure of the event to the public. Another example is that a competing studio may be scheduling a release for the same day.

The CRB of the present invention also includes a "multi-venue" function in which a first portion of the data, such as two months April and May, is displayed at a first display device and a second portion, July, is displayed at another device. This permits different groups to review and revise various segments of the CRB independently. In order to prevent confusion, any edits to the CRB are done while that portion is only available to edit by one person or group at a time.

It will be appreciated from the above that the invention may be implemented as computer software, which may be supplied on a storage medium or via a transmission medium such as a local-area network or a wide-area network, such as the Internet. It is to be further understood that, because some of the constituent system components and method steps depicted in the accompanying Figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. A method for manipulating data on a competitive release board, in a video wall display format that displays twelve months at a time, each month separately displayed along a video wall display, for movie release dates by movie production studio sources comprising the steps of:

accessing content data from movie production studio sources of the content data;

generating a data record from the content data of each movie production studio source;

augmenting each data record for additional data based on a conflict actually impacting the movie release data and a conflict potentially impacting the movie release data to form an augmented data record;

displaying in table format, for each month displayed on the video wall display, a representation of the augmented data record for each movie production studio source in separate rows in a column direction on one or more display modules such that a display position is a function of a time portion of the content data, the time portion extending in a single row direction of the table format, the time portion being a movie release date to consumers;

accessing the representation of the augmented data record to display the additional data, revising the movie release date of the augmented data record based on a user's edits to the data record, the conflict impacting the movie release date and the conflict potentially impacting the movie release date such that the display position of the representation of the augmented data record in the row for its movie production studio source is electronically changed;

displaying, for each month displayed on the video wall display, the representation of the revised augmented data record in a new time position in the row for its movie production studio source on the one or more display modules reflecting the revision;

identifying one or more contingency conditions as content data;

in response to the identified one or more contingency conditions, and without further input from the user, adjusting the position of the representation of the revised augmented data record based on the contingency condition.

2. The method as claimed in claim 1, further comprising: modifying the portion of the content data based on the contingency condition.

3. The method as claimed in claim 1, where the content data includes sporting event data or entertainment event data.

4. The method as claimed in claim 1, further comprising: establishing one or more alert criterion based on accessed content data.

5. The method as claimed in claim 4, further comprising: modifying the portion of the content data based on the one or more alert criterion.

6. The method as claimed in claim 1, wherein the step of displaying the augmented data record includes utilizing a plurality of display devices configured such that each display device displays a predetermined amount of one or more augmented data records.

7. The method as claimed in claim 1, wherein the step of displaying the augmented data record includes utilizing a display device configured to display a predetermined amount of one or more augmented data records.

8. The method as claimed in claim 1, wherein the step of displaying the augmented data record further comprises:
displaying a first quantity of augmented data records at a first display device; and
displaying a second quantity of augmented data records at a second display device.

9. The method as claimed in claim 1, wherein the step of displaying the augmented data record further comprises scrolling.

10. The method as claimed in claim 1, further comprising: sorting each augmented data record;
displaying the sorted augmented data record based on the sorting operation.

11. The method as claimed in claim 1, wherein the additional data includes audio data, text data or preview data.

12. The method as claimed in claim 11, wherein the additional data includes a static image.

13. The method as claimed in claim 11, wherein the additional data includes static image data combined with video data on a single display.

14. The method as claimed in claim 1, wherein the step of generating the first data record from the content data includes user input.

15. The method as claimed in claim 1, wherein the step of augmenting each data record to form the augmented data record includes user input.

16. A method for displaying data on a competitive release board, in a video wall display format that displays twelve months at a time, each month separately displayed along a video wall display, for movie release dates by movie production studio sources comprising the steps of:
accessing content data from movie production studio sources of the content data;
generating a product record from the content data of each movie production studio source, that includes an associated date identifier;
augmenting each product record for additional data, utilizing user input, a conflict actually impacting the movie release data and a conflict potentially impacting the movie release date, to form an augmented product record;
displaying in table format, for each month displayed on the video wall display, a representation of the augmented product record for each movie production studio source in separate rows in a column direction on one or more display modules such that a display position is a function of the date identifier, wherein dates extending in a single row direction of the table format, the date identifier being a movie release date to consumers;
accessing the representation of the augmented product record to display the additional data;
revising the movie release date, by user input, of the augmented product record based on a user input, the conflict impacting the movie release date and the conflict potentially impacting the movie release date such that the display position of the representation of the augmented product record in the row of its movie production studio source is electronically changed;
displaying, for each month displayed on the video wall display, the representation of the revised augmented product record in a different time position in the row of its movie production studio source on the one or more display modules that reflects the revised date identifier;
identifying one or more contingency conditions as content data;
in response to the identified one or more contingency conditions, and without further input from the user, adjusting the position of the representation of the revised augmented data record based on the contingency condition.

17. An apparatus for manipulating data on a competitive release board, in a video wall display format that displays twelve months at a time, each month separately displayed along a video wall display, for movie release dates by movie production studio sources in one or more databases, said apparatus comprising:
at least one programmable processor, a memory operatively coupled to the at least one processor, and an electronic display device operatively coupled to the at least one processor, and at least one computer input device operatively coupled to the at least one processor;
wherein the memory contains instructions that, when executed by at least one of the processors, causes the apparatus to carry out instructions including
accessing content data from movie production studio databases of the content data;
generating a data record from the content data of each movie production studio source;
augmenting each data record for additional data based on a conflict actually impacting the movie release data and a conflict potentially impacting the movie release data to form an augmented data record;
displaying in table format, for each month displayed on the video wall display, a representation of the augmented data record for each movie production studio source in separate rows in a column direction on one or more display modules such that a display position is a function of a time portion of the content data, the time portion extending in a single row direction of the table format, the time portion being a movie release date to consumers;
accessing the representation of the augmented data record to display the additional data, revising the movie release date of the augmented data record based on a user's edits to the data record, the conflict impacting the movie release date and the conflict potentially impacting the movie release date such that the display position of the representation of the augmented data record in the row for its movie production studio source is electronically changed;

displaying, for each month displayed on the video wall display, the representation of the revised augmented data record in a new time position in the row for its movie production studio source on the one or more display modules reflecting the revision;

identifying one or more contingency conditions as content data;

in response to the identified one or more contingency conditions, and without further input from the user, adjusting the position of the representation of the revised augmented data record based on the contingency condition.

18. An apparatus for displaying data in a competitive release board, in a video wall display format that displays twelve months at a time, each month separately displayed along a video wall display, for movie release dates by movie production studio sources, said apparatus comprising:

at least one programmable processor, a memory operatively coupled to the at least one processor, and an electronic display device operatively coupled to the at least one processor, and at least one computer input device operatively coupled to the at least one processor;

wherein the memory contains instructions that, when executed by at least one of the processors, causes the apparatus to carry out instructions including accessing content data from movie production studio sources of the content data;

generating a product record from the content data of each movie production studio source, that includes an associated date identifier;

augmenting each product record for additional data, utilizing user input, a conflict actually impacting the movie release data and a conflict potentially impacting the movie release date, to form an augmented product record;

displaying in table format, for each month displayed on the video wall display, a representation of the augmented product record for each movie production studio source in separate rows in a column direction on one or more display modules such that a display position is a function of the date identifier, wherein dates extend in a single row direction of the table format, the date identifier being a movie release date to consumers;

accessing the representation of the augmented product record to display the additional data;

revising the movie release date, by user input, of the augmented product record based on a user input, the conflict impacting the movie release date and the conflict potentially impacting the movie release date such that the display position of the representation of the augmented product record in the row of its movie production studio source is electronically changed;

displaying, for each month displayed on the video wall display, the representation of the revised augmented product record in a different time position in the row of its movie production studio source on the one or more display modules that reflects the revised date identifier;

identifying one or more contingency conditions as content data;

in response to the identified one or more contingency conditions, and without further input from the user, adjusting the position of the representation of the revised augmented data record based on the contingency condition.

19. A computer program product for a competitive release board, in a video wall display format that displays twelve months at a time, each month separately displayed along a video wall display, for movie release dates by movie production studio sources, comprising one or more non-transitory computer readable storage medium encoded with computer-readable instructions that, when executed on at least one processor within a computer system, cause the computer system to perform a method, comprising:

accessing content data from movie production studio databases of the content data;

generating a data record from the content data of each movie production studio source;

augmenting each data record for additional data based on a conflict actually impacting the movie release data and a conflict potentially impacting the movie release data to form an augmented data record;

displaying in table format, for each month displayed on the video wall display, a representation of the augmented data record for each movie production studio source in separate rows in a column direction on one or more display modules such that a display position is a function of a time portion of the content data, the time portion extending in a single row direction of the table format, the time portion being a movie release date to consumers;

accessing the representation of the augmented data record to display the additional data, revising the movie release date of the augmented data record based on a user's edit to the data record, the conflict impacting the movie release date and the conflict potentially impacting the movie release date such that the display position of the representation of the augmented data record in the row of its movie production studio source is electronically changed;

displaying, for each month displayed on the video wall display, the representation of the revised augmented data record in a new time position in the row of its movie production studio source on the one or more display modules reflecting the revision;

identifying one or more contingency conditions as content data;

in response to the identified one or more contingency conditions, and without further input from the user, adjusting the position of the representation of the revised augmented data record based on the contingency condition.

20. A computer program product for a competitive release board, in a video wall display format that displays twelve months at a time, each month separately displayed along a video wall display, for movie release dates by movie production studio sources comprising one or more non-transitory computer readable storage medium encoded with computer-readable instructions that, when executed on at least one processor within a computer system, cause the computer system to perform a method, comprising:

accessing content data from movie production studio sources of the content data;

generating a product record from the content data of each movie production studio source, that includes an associated date identifier;

augmenting each product record for additional data, utilizing user input, a conflict actually impacting the movie release data and a conflict potentially impacting the movie release date, to form an augmented product record;

displaying in table format, for each month displayed on the video wall display, a representation of the augmented product record for each movie production studio source in separate rows in a column direction on one or more display modules such that a display position is a function of the date identifier, wherein dates extend in a single row direction of the table format, the date identifier being a movie release date to consumers;

accessing the representation of the augmented product record to display the additional data;

revising the movie release date, by user input, of the augmented product record based on a user input, the conflict impacting the movie release date and the conflict potentially impacting the movie release date such that the display position of the representation of the augmented product record in the row of its movie production studio source is electronically changed;

displaying, for each month displayed on the video wall display, the representation of the revised augmented product record in a different time position in the row of its movie production studio source on the one or more display modules that reflects the revised date identifier;

identifying one or more contingency conditions as content data;

in response to the identified one or more contingency conditions, and without further input from the user, adjusting the position of the representation of the revised augmented data record based on the contingency condition.

* * * * *

UNITED STATES PATENT AND TRADEMARK OFFICE
CERTIFICATE OF CORRECTION

PATENT NO. : 9,542,058 B2
APPLICATION NO. : 12/799223
DATED : January 10, 2017
INVENTOR(S) : Melissa Emery et al.

It is certified that error appears in the above-identified patent and that said Letters Patent is hereby corrected as shown below:

Assignees:
Should read as follows:
SONY CORPORATION, Tokyo (JP);
SONY PICTURES ENTERTAINMENT, INC., Los Angeles, CA (US)

Signed and Sealed this
Fourteenth Day of March, 2017

Michelle K. Lee
*Director of the United States Patent and Trademark Office*